United States Patent [19]

Childs et al.

[11] Patent Number: 5,365,228

[45] Date of Patent: Nov. 15, 1994

[54] SYNC-NET- A BARRIER SYNCHRONIZATION APPARATUS FOR MULTI-STAGE NETWORKS

[75] Inventors: Philip L. Childs; Howard T. Olnowich, both of Endicott; Joseph F. Skovira, Binghamton, all of N.Y.

[73] Assignee: International Business Machines Corporation, Armonk, N.Y.

[21] Appl. No.: 748,303

[22] Filed: Aug. 21, 1991

Related U.S. Application Data

[63] Continuation-in-part of Ser. No. 677,543, Mar. 29, 1991, abandoned.

[51] Int. Cl.$^5$ .............. H04Q 11/00; G06F 13/00
[52] U.S. Cl. ................ 340/825.8; 340/826; 340/825.5; 370/94.2; 370/94.3
[58] Field of Search ............ 340/825.02, 825.5, 825.8, 340/826; 370/60, 53, 54, 58.1, 91, 93, 94.2, 94.3

[56] References Cited

U.S. PATENT DOCUMENTS

| | | | |
|---|---|---|---|
| 3,246,298 | 4/1966 | Schramel et al. | 340/825 |
| 3,268,866 | 8/1966 | Van't Slot et al. | 340/825 |
| 4,237,447 | 12/1980 | Clark | 340/825 |
| 4,251,879 | 2/1981 | Clark | 370/60 |
| 4,307,378 | 12/1981 | Clark | 340/825.02 |
| 4,307,446 | 12/1981 | Barton et al. | 340/825.02 |
| 4,314,233 | 2/1982 | Clark | 340/825.02 |
| 4,475,188 | 10/1984 | Wilson et al. | 370/60 |
| 4,481,623 | 11/1984 | Clark | 370/60 |

(List continued on next page.)

OTHER PUBLICATIONS

IBM TDB vol. 30, No. 1, Jun. 1987 pp. 72–78, Pol Actuated Multiple Access Technique for Broadgathering Systems.
IBM TDB vol. 22, No. 12, May 1980 pp. 5450–5452, Distributed Star Network with Unrooted Tree Topology.
IEEE Trans. Computers C–32, 175–189 (Feb. 1983), NYU Ultracomputer Gottlieb et al.
IBM Research Parallel Processor Prototype "Proceedings of 1985 International Conference on Parallel Processing", pp. 764–769.

Primary Examiner—Michael Horabik
Attorney, Agent, or Firm—Lynn L. Augspurger; Eugene I. Shkurko

[57] ABSTRACT

A SYNC-NET apparatus synchronizes processor nodes of a parallel system over a multi-stage communication network that normally transmits data between nodes as point-to-point communications, broadcast, multi-cast, or multi-sender transfers. The apparatus performs priority driven arbitration over the network to resolve conflicts amongst multiple processing nodes simultaneously requesting use of the multi-stage network for performing barrier synchronization over the network in relation to the same or different barriers. The apparatus uses a special capability multi-stage network that can support only one barrier synchronization operation at any given time, and which makes it necessary to perform a priority arbitration to determine which barrier synchronization gets performed first, second, and so on. Any number of processor nodes can arbitrate simultaneously for use of the barrier synchronization facilities, and the arbitration will be resolved quickly and consistently by selecting the highest priority requestor. The highest priority requestor uses the apparatus and network facilities to examine the status of eight barriers simultaneously and to determine whether all processing nodes have reached those barriers or not. The priority resolution and barrier status calculation for eight barriers at a time involve both the joint and simultaneous participation by all processor nodes and the multi-stage network in one common operation. All nodes transmit priority information or barrier status simultaneously, and all nodes simultaneously monitor the result of the priority and barrier calculations.

23 Claims, 23 Drawing Sheets

U.S. PATENT DOCUMENTS

| | | | |
|---|---|---|---|
| 4,482,996 | 11/1984 | Wilson et al. | 370/60 |
| 4,484,325 | 11/1984 | Wilson et al. | 370/60 |
| 4,518,960 | 5/1985 | Clark | 340/825.02 |
| 4,623,996 | 11/1986 | McMillen | 370/60 |
| 4,701,906 | 10/1987 | Ransom et al. | 370/60 |
| 4,706,080 | 11/1987 | Sincoskie | 340/825.02 |
| 4,754,395 | 6/1988 | Weisshaar et al. | 364/200 |
| 4,766,592 | 8/1988 | Baral et al. | 370/62 |
| 4,815,105 | 3/1989 | Bottoms et al. | 375/37 |
| 4,818,984 | 4/1989 | Chang et al. | 340/825.54 |
| 4,835,674 | 5/1989 | Collins et al. | 364/200 |
| 4,855,899 | 8/1989 | Presant | 364/200 |
| 4,897,834 | 1/1990 | Peterson et al. | 370/85.1 |
| 4,926,375 | 5/1990 | Mercer et al. | 370/94.1 |
| 4,935,866 | 6/1990 | Sauvajol et al. | 364/200 |
| 4,941,084 | 7/1990 | Terada et al. | 340/825.07 |
| 4,952,930 | 8/1990 | Franaszek et al. | 340/825.8 |
| 4,956,772 | 9/1990 | Neches | 340/825.02 |

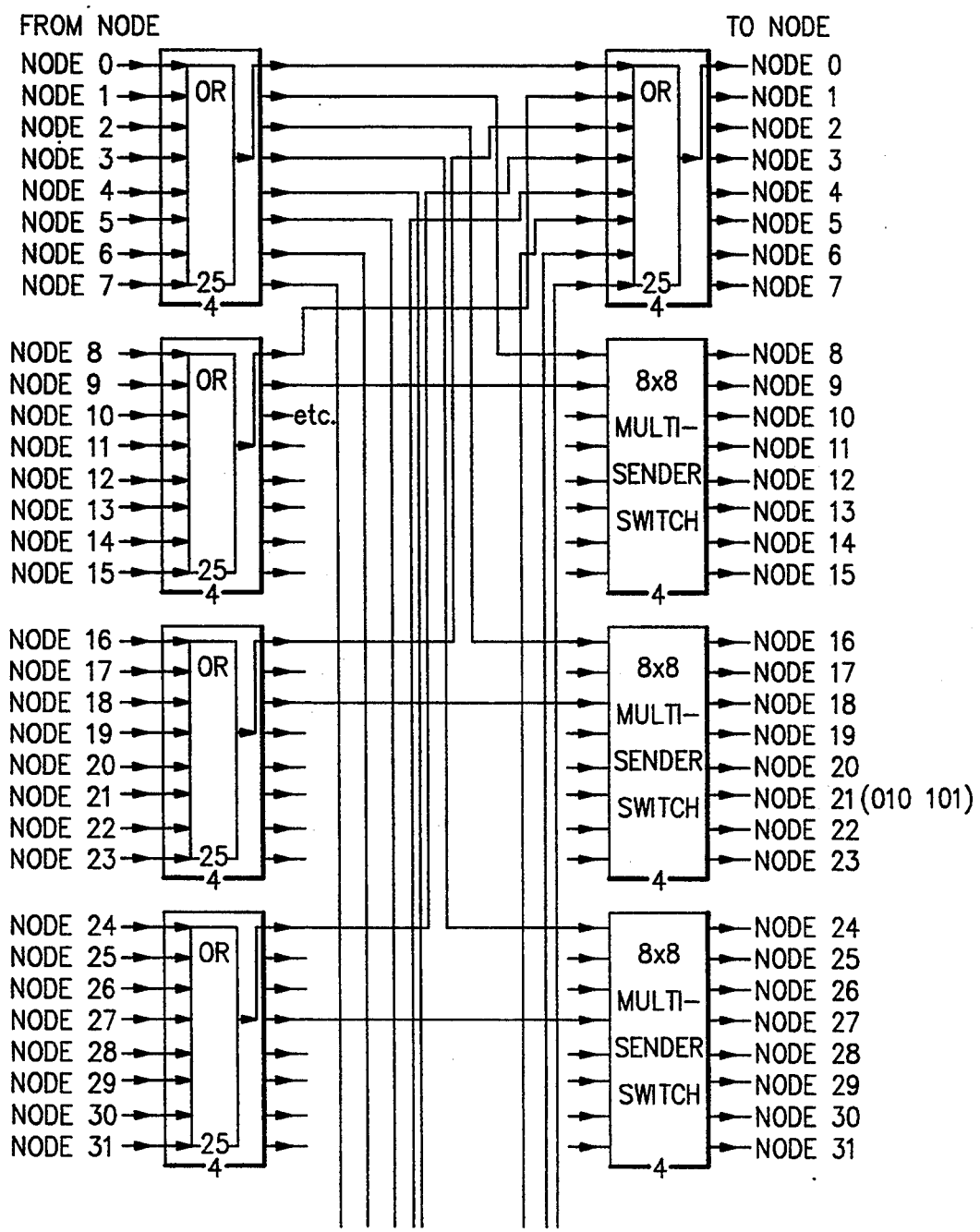

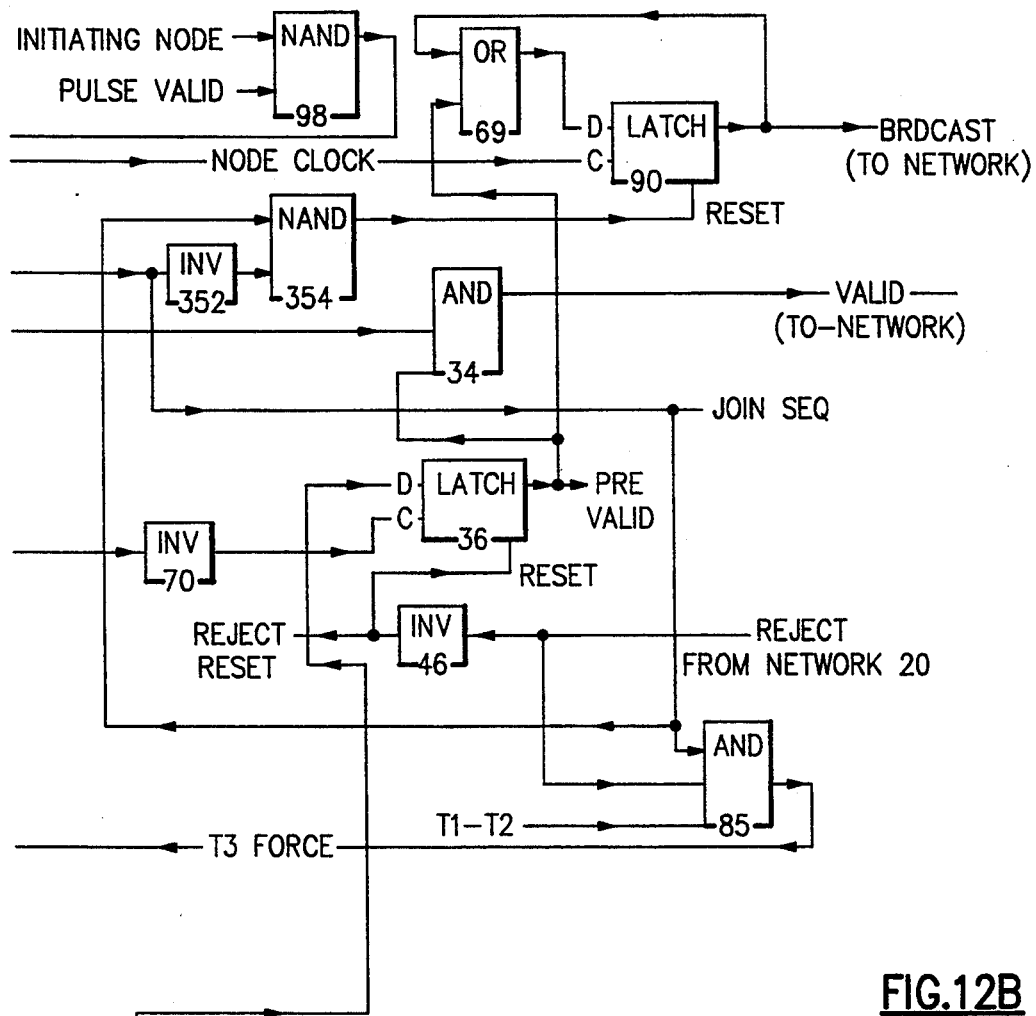
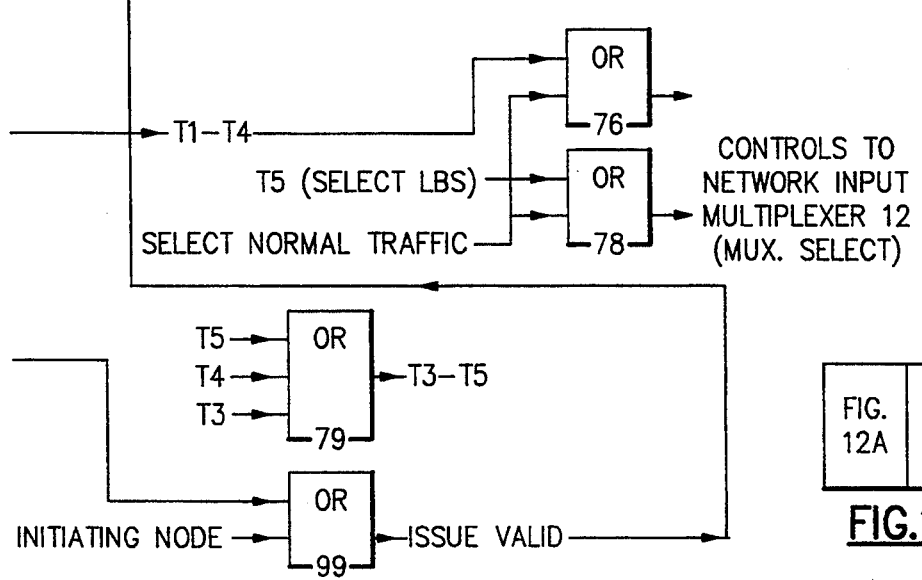
FIG.12B
FIG.12

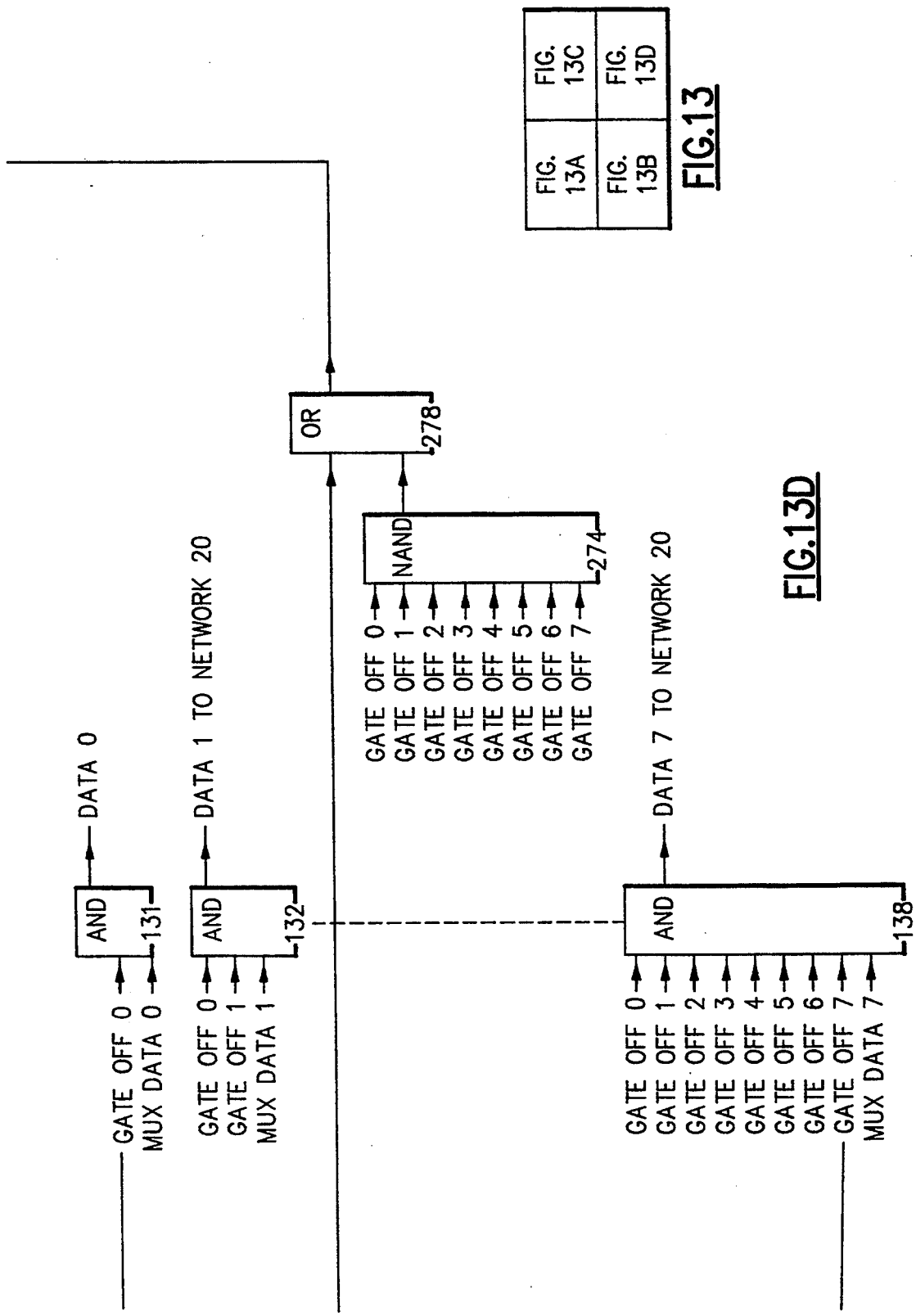

SYNC-NET- A BARRIER SYNCHRONIZATION APPARATUS FOR MULTI-STAGE NETWORKS

RELATED APPLICATIONS

The present U.S. patent application claims priority and is related to the following application of which this is a continuation-in-part: U.S. Ser. No. 07/677,543, filed Mar. 29, 1991 now abandoned, entitled "ALLNODE SWITCH—AN UNCLOCKED, UNBUFFERED, ASYNCHRONOUS, SWITCHING APPARATUS"; Lusch et al.

The present U.S. patent application is also related to the following U.S. patent applications filed concurrently herewith.

U.S. Ser. No. 07/748,316, filed Aug. 21, 1991 entitled "BROADCAST/SWITCHING APPARATUS FOR EXECUTING BROADCAST/MULTI-CAST TRANSFERS OVER UNBUFFERED ASYNCHRONOUS SWITCHING NETWORKS"; Olnowich et al.

U.S. Ser. No. 07/748,302, filed Aug. 21, 1991 entitled "MULTI-SENDER/SWITCHING APPARATUS FOR STATUS REPORTING OVER UNBUFFERED ASYNCHRONOUS MULTI-STAGE NETWORKS": Olnowich et al.

U.S. Pat. No. 5,250,943 entitled "GVT-NET-A GLOBAL VIRTUAL TIME CALCULATION APPARATUS FOR MULTI-STAGE NETWORKS"; Olnowich et al.

These applications and the present application is owned by one and the same assignee, namely, International Business Machines Corporation of Armonk, N.Y.

The descriptions set forth in the previous application and the concurrently filed applications are hereby incorporated herein by reference.

FIELD OF THE INVENTIONS

This invention relates to the field of parallel and multi-processing and more specifically to the means of synchronizing multiple processors functioning asynchronously at certain predetermined programmable barriers. The invention further relates to a hardware mechanism implemented for use over a special function multi-stage network which has the capability to greatly enhance the speed and efficiency of the barrier synchronization operation. The invention further relates to unbuffered, asynchronous, multi-stage switching networks, and particularly to byte wide parallel crossbar switches for a multi-sized interface switch for supporting network operations involving multiple sending elements concurrently and jointly participating in a single co-ordinated barrier synchronization function over the multi-staged switching network.

BACKGROUND OF THE INVENTIONS

In the field of parallel processing, the synchronization of many processors working on the same task is an important consideration. If not done efficiently, the synchronization task can over-burden the communication network and greatly reduce the effectiveness of parallel processing or add excessive cost.

One synchronization approach discussed widely in the literature is Barrier Synchronization. With this approach, each processing node can be allowed to free-run and can keep track of its own local time and synchronize with the other processors at barriers which are defined under software control. With barrier synchronization, the processors proceed until they reach a predefined barrier synchronization point. Any processor involved in a given barrier will proceed to the barrier and then wait at the barrier until all other processors involved have reached the barrier; then a new barrier is defined and the processors move toward it.

One very cumbersome drawback of the state-of-the-art barrier synchronization approaches is that the implementations can require a unique "BACKBONE" network, in addition to the normal message or data passing multi-stage switching network. Even worse, every "BACKBONE" network can only service one barrier at a time, so that a parallel system that requires many simultaneous barriers would have to implement many "BACKBONE" networks, which is both cumbersome and expensive.

It is important to handle synchronization techniques efficiently in parallel systems, and it is preferable to incorporate such synchronization in the normal communication networks that carry message traffic between processor nodes in a parallel system. Handling barriers over the normal data passing network saves the addition of new hardware between all nodes for synchronization. It is also preferable that barrier synchronization operations be able to have many different barriers active simultaneously—the more the better—and that there be a very inexpensive and efficient way of handling multiple barriers. The present invention presents a barrier synchronization method by which unlimited simultaneous barriers can all be processed efficiently over normal unbuffered multi-stage networks.

SUMMARY OF THE INVENTION

The present invention provides a solution applicable to performing barrier synchronization operations over switching networks in addition to the standard network interconnections such as point-to-point, broadcast, and multi-cast transfers. The present invention describes this new and unique means of synchronizing over multi-stage networks that implement special capabilities such as of performing broadsender and multi-sender operations, which are defined as the ability of all or multiple elements attached to the network to transmit and participate simultaneously in the same network operation on a joint basis, as disclosed in U.S. Ser. No. 07/748,302, filed Aug. 21, 1991 entitled "MULTI-SENDER/SWITCHING APPARATUS FOR STATUS REPORTING OVER UNBUFFERED ASYNCHRONOUS MULTI-STAGE NETWORKS": Olnowich et al. Our solution not only makes the barrier synchronizations easy to execute over unbuffered asynchronous networks, but it provides the capability to calculate unlimited numbers of barrier synchronization functions over the same network means in a consistent and efficient manner—a capability which is heretofore unavailable over synchronous buffered networks and other types of networks. The combination of the multi-sender and multi-cast functions in the multi-stage network provide a means whereby every element attached to the multi-stage network can participate in one common barrier synchronization function to present its status in relation to the specified barrier and at the same time monitor the status of all other processors in relation to the barrier.

The present invention, referred to as SYNC-NET, is also predicated on the basic unbuffered asynchronous switch described in U.S. Ser. No. 07/677,543, filed Mar.

29, 1991 entitled "Allnode Switch—an unclocked, unbuffered, asynchronous, switching apparatus" and the broadcast extension of the switch described in U.S. Ser. No. 07/748,316, filed Aug. 21, 1991 entitled "BROADCAST/SWITCHING APPARATUS FOR EXECUTING BROADCAST/MULTI-CAST TRANSFERS OVER UNBUFFERED ASYNCHRONOUS SWITCHING NETWORKS".

The present invention is capable of performing priority driven arbitration processes over the network to resolve conflicts among multiple processing nodes simultaneously requesting the use of multi-stage network for the purpose of performing barrier synchronization operations over the network in relation to the same or different barriers. Since the special capability multi-stage network can support only one barrier synchronization operation at any given time, there must occur a priority arbitration to resolve which barrier synchronization gets performed first, which gets performed next, and so on. Thus, the present invention provides the means whereby any number of processor nodes can arbitrate simultaneously for use of the barrier synchronization facilities of the network, and the arbitration will be resolved quickly and consistently by selecting the highest priority requestor. The priority resolution means involve the joint and simultaneous participation of all processor nodes and the multi-stage network in one common operation.

The multi-stage network can perform the distributed arbitration function heretofore known only to multi-drop bus communication systems, such as the IBM Microchannel as described in the IBM Hardware Technical Reference for the Microchannel Architecture (IBM Publication SA23-2647-00), where each element places its arbitration level on the bus simultaneously. On the Microchannel bus zeroes dominate over ones, and each sending element can read the bus to determine whether the arbitration level it placed on the bus has dominated or not. The present invention is capable of performing the same type of arbitration operation over the multi-stage network, with the exception being that ones will dominate over the network instead of zeroes. The network implements multi-sender and broadcast operations simultaneously to perform the arbitration operation. Each processor node vying for use of the network sends its priority level to the network simultaneously as a multi-sender operation. The network logically ORs all the priority levels presented and returns the result to all processor nodes as a broadcast operation. Each processor node then compares the priority value it transmitted to the ORed value it receives back on a bit by bit basis. If the values are not the same, the processing node drops out of the competition, it loses the competition, stops sending its priority level, and waits for the next competition. After a fixed time period, all competitors will have withdrawn from the competition except for those having the highest priority level.

The one winning node or nodes that have the highest priority level, then own the network and by virtue of the priority level they are transmitting define a barrier synchronization operation for a specific barrier. All processing nodes receive the bit pattern of the winning priority level (whether they are driving the bit pattern or not) and decode the pattern as a command requesting them to return the status for a particular set of eight barriers, for instance barrier set m. Every processor node receives the command and responds by transmitting simultaneously with all other nodes its Local Barrier Status for barrier set m to the network. This is referred to as a multi-sender operation, where all nodes transmit their status simultaneously. The network ORs in a separate OR gate each of the 8 individual status indications for the eight barriers of set m as they are sent to the network over eight individual data lines (one barrier per data line). Since a logical one will dominate the OR function, any node which transmits a ONE to the network on a given data line will cause the network output associated with that data line to go to a ONE. A ONE indicates that all nodes have not yet reached the individual barrier. If all n nodes send logical ZEROES to the network for an individual barrier of set m, the associated network output goes to a ZERO, indicating that all nodes have reached the individual barrier. Simultaneously, in broadcast fashion, the network sends the result to all processor nodes so that all the nodes know immediately and simultaneously whether all processor nodes have reached each individual barrier of set m or not. This completes the operation, and the winning node or nodes terminate the operation, leaving the said network free to perform the next operations, which can be point-to-point transfers, broadcast or multi-cast operations, or another barrier synchronization or other type of multi-sender operation.

In accordance with our inventions, we provide a hardware circuit for implementing the barrier synchronization function which works equally well through one network stage or multiple cascaded network stages.

The barrier synchronization apparatus has the ability to delay the network operation until all network paths become available and until all multi-senders have joined the operation. In addition, the invention apparatus has the capability of providing a positive feedback acknowledgement that it has made connections to all the commanded paths and that all multi-senders have joined the operation and have transmitted their individual barrier status responses. This is provided uniquely for each stage of the network.

Also, we have included the capability for allowing multiple processor nodes to request the same priority level and the barrier status for the same barrier set (for instance barrier set m) simultaneously and to resolve such conflicts instantaneously and consistently in one operation which satisfies the multiplicity of requests.

These features and other improvements are detailed in the following description. For a better understanding of the inventions, together with related features, reference may be had to the previous allnode switch, broadcast/switch, and multi-sender switch applications. Further, specifically as to the improvements described herein, reference should .be made to the following description and the below-described drawings.

BRIEF DESCRIPTION OF THE DRAWINGS

FIGS. 12, 12A, and 12B illustrate in part the detailed logic implementation of the preferred embodiment of the SYNC-NET function located at each processing node and in particular the initiating, joining, and timing functions required.

FIGS. 13, 13A, 13B, 13C, and 13D illustrate in part the detailed logic implementation of the preferred embodiment of the SYNC-NET function located at each processing node and in particular the priority resolution and barrier status passing functions required.

DETAILED DESCRIPTION OF THE PREFERRED EMBODIMENTS

Figure 1:
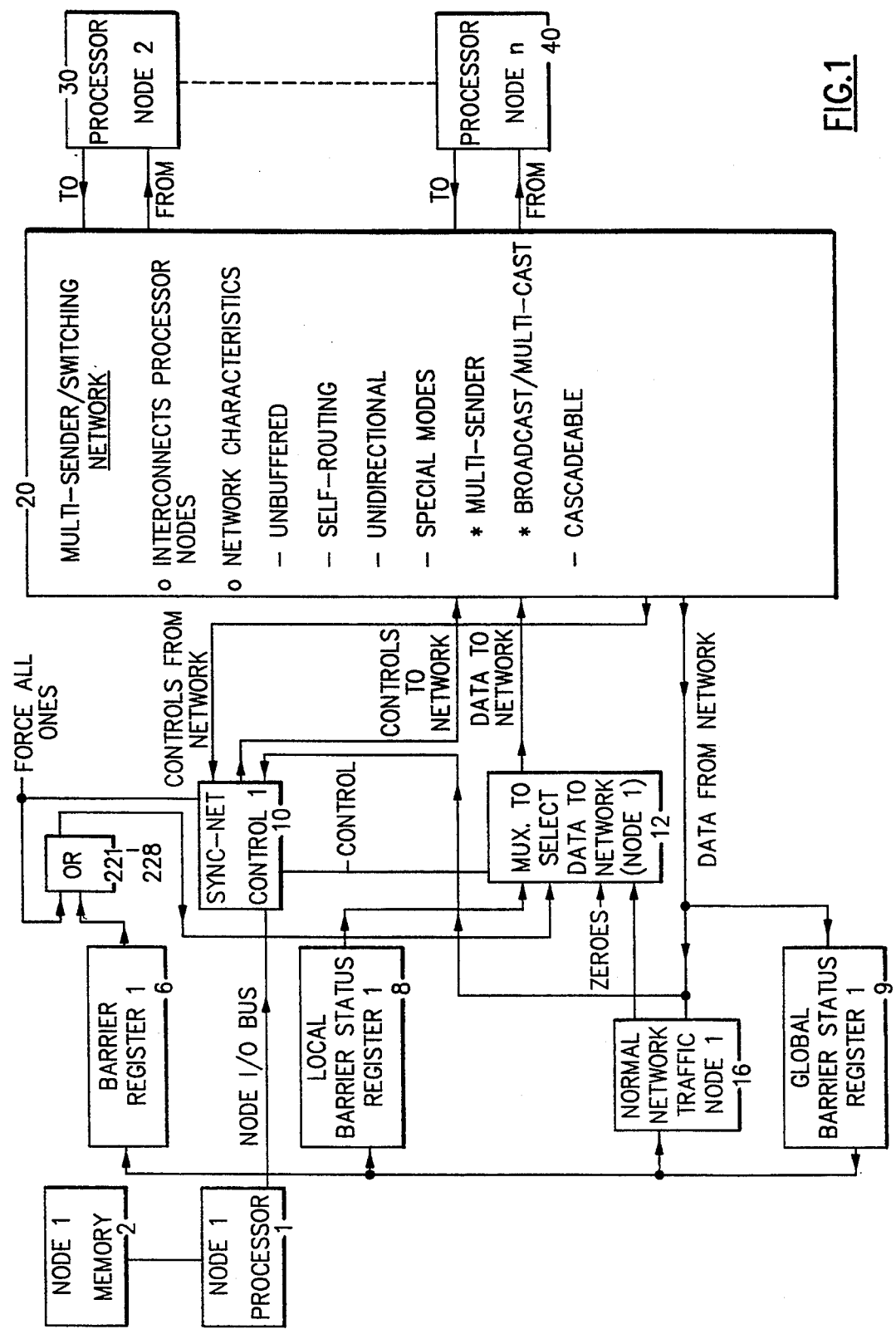
FIG. 1 illustrates generally the functional diagram of our preferred embodiment of the present invention as a hardware means implemented at each processing node and communicating jointly over a multi-stage network comprised of multi-sender/switching apparatus devices.

The preferred embodiment of the disclosed SYNC-NET invention permits all processor nodes of a parallel system to synchronize over the communication multi-stage network that normally transmits data between nodes as point-to-point communications, broadcast, multi-cast, or multi-sender transmissions. Referring to FIG. 1, network 20 is a multi-processor interconnection network used to pass data and commands among n processor nodes referred to as 1, 30 to 40; where n can theoretically be any positive integer. To perform barrier synchronization functions over network 20, the said network must be composed of switch components which have specific characteristics, such as being unbuffered and having the ability to perform multi-sender and broadcast operations as disclosed in copending applications U.S. Ser. Nos. 07/677,543; 07/748,316; and 07/748,302;

The present invention is capable of performing priority driven arbitration processes over the network 20 to resolve conflicts among multiple processors simultaneously requesting the use of network 20 to perform barrier synchronization operations for the same or different barriers. Since network 20 can support only one barrier synchronization operation at any given time, there must occur a priority arbitration to resolve which said barrier synchronization gets performed first, which gets performed next, and so on. Thus, the present invention provides the means whereby all n processor nodes 1, 30 to 40 can arbitrate simultaneously for use of the barrier synchronization facilities of network 20, and the arbitration will be resolved quickly and consistently by selecting the highest priority requestor or requestors. The priority resolution means involve the joint and simultaneous participation by all n nodes and network 20 in one common operation.

Referring to FIG. 1, blocks 6 through 12 show the major functional blocks required to implement SYNC-NET at processor node 1; identical blocks are required at all n nodes to enable synchronization to occur among all n processor nodes. Block 6 is the BARRIER SELECT REGISTER which defines a unique set of eight barriers that the node processor 1 wishes to update at any given time. The SYNC-NET implementation permits eight different barriers to be operated on in a single network operation. There is basically no limit to the number of barrier sets that can be defined; however, for the purpose of explanation, assume that there is an imposed limit of 255 sets of 8 barriers each and that each set is defined by a unique bit pattern in the 8 bit Barrier Select Register 6 (the bit pattern of all zeroes is not a legal barrier select value; thus eight bits can define 255 barrier sets, not 256).

Block 8 is the node 1 Local Barrier Status Register that stores the local processor's status in relation to one of the 255 individual barrier sets of eight barriers in the system. Block 9 is the Global Barrier Status Register that defines the combined status of all nodes in relation to one of the 255 individual barrier sets of eight barriers; i.e., its contents determine whether processors have reached each individual barrier in the set or not. The individual bits stored in these registers each have meaning with regard to one and only one barrier. For instance, the high order register bit 0 controls Barrier #0 in a given set of eight barriers; whereas, the least significant bit 7 controls Barrier #7 in a given set of eight barriers.

A zero in any bit in the Local Barrier Status Register signifies that the local processor node either doesn't participate in the associated barrier or it has reached the barrier. A logical one in any bit in the Local Barrier Status Register signifies that the local processor node does participate in that barrier and it has NOT reached the barrier.

A zero in any bit in the Global Barrier Status Register signifies that all of the n processor nodes have either reached the barrier or are not involved. A logical one in any bit in the Global Barrier Status Register signifies that all the participating nodes have NOT reached the barrier. Every node has its own Local Barrier Status Register and own Global Barrier Status Register. The Local Barrier Status Registers are updated individually by their associated local processors as their individual tasks advance. The Global Barrier Status Registers at all n nodes are updated simultaneously by the SYNC-NET operation performed over network 20. Thus, all n Global Barrier Status Registers always contain identical values. This is unlike the Local Barrier Status Registers which contain independent values at any given time. The Local Barrier Status Registers transmit data to the network 20 where it is ORed by the network with data from all nodes, and the Global Barrier Status Registers receive the ORed data back from the network and store it at each processing node.

Block 16 sends and receives normal message traffic over the network; whereas, blocks 10 and 12 function together to control the SYNC-NET operation and provide Global Barrier Status (GBS) among the n processor nodes. The main function of SYNC-NET is to use the network to find the Global Barrier Status at any given moment for the selected set of 8 individual barriers. This is accomplished by performing a multi-sender and broadcast operation to all n nodes to examine all nodes simultaneously and to calculate an updated Global Barrier Status (GBS). SYNC-NET can be commanded to do this function from any processor node by the local processor (block 1) or other special purpose hardware.

Figure 2:
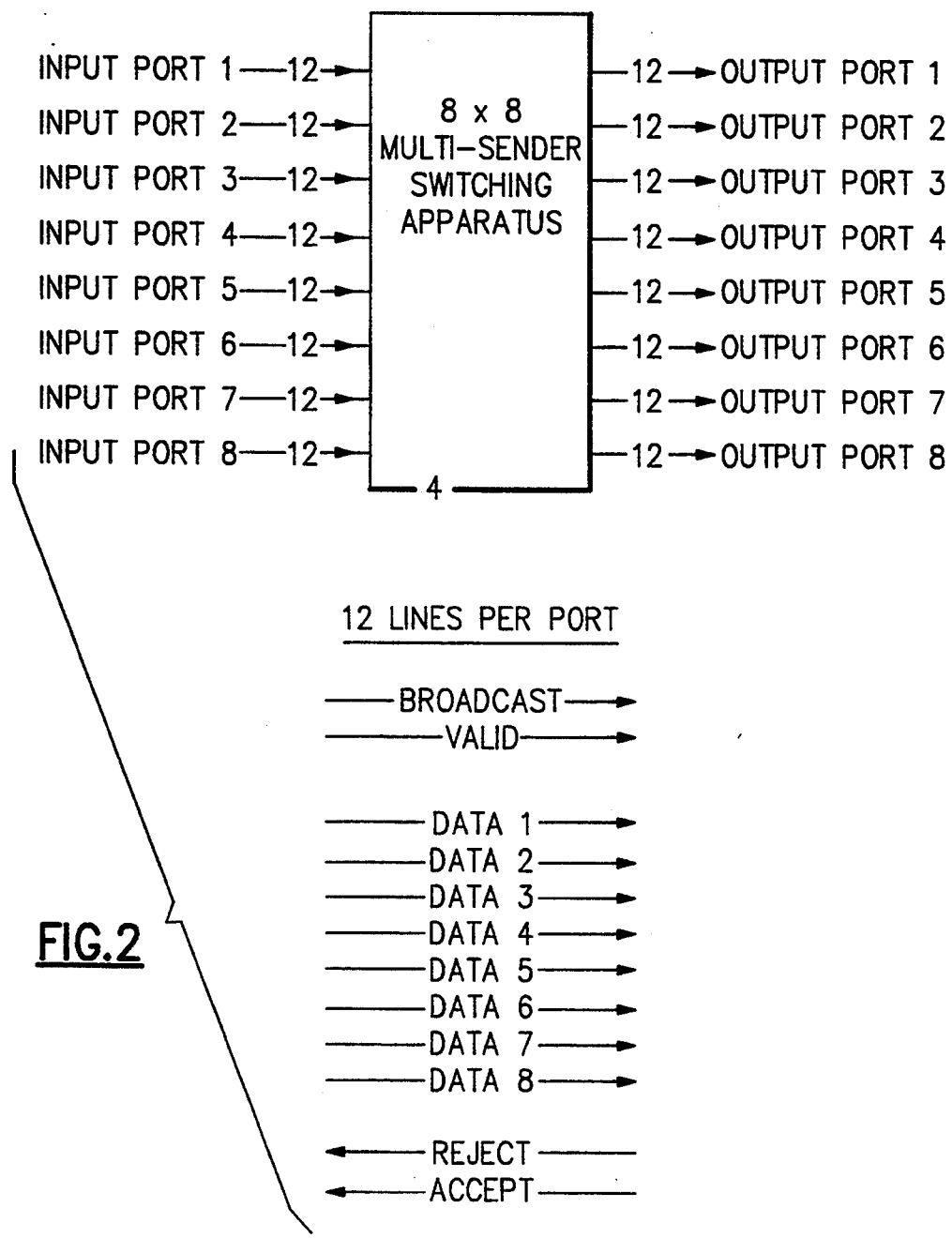
FIG. 2 illustrates the detailed input and output port interfaces of the 8×8 crossbar, multi-sender/switching apparatus which comprises the multi-stage network.

SYNC-NET Control block 10 starts the processing of a GBS Command by activating its interface to the network and beginning a transmission to poll all n processor nodes simultaneously. The interface that every node has to the network is the interface to and from the Multi-sender/switching apparatus 4 comprising network 20 as shown in FIG. 2. Actually, this interface is unidirectional so every node requires two such interfaces with network 20—one going to the network and one coming from the network. Control block 10 starts a GBS transfer by activating its VALID and BRDCAST lines to the network and indicating it wants to connect simultaneously to all nodes by transmitting a broadcast routing command.

The network 20 then works on establishing connection to all n nodes. This is accomplished on a switch by switch basis until all stages of the network have been traversed and all n nodes are connected via the network. The method of accomplishing the broadcast connection through the network 20 is described copending applications U.S. Ser. Nos. 07/748,316 and 07/748,302 and is usually established in 900 ns or less.

Once the broadcast connection is totally established, the network informs Control block 10 by activating the ACCEPT line of FIG. 2. Control block 10 then issues a multi-sender JOIN command to all nodes over the connections it has established in network 20. All nodes receive this command and join the operation as multi-senders; this process involves each node's individually sending path selection commands to the network 20 to establish network connections that tie them into the present operation as multi-senders being ORed into the present broadcast connections. The process of establishing multi-sender network connections is described in detail in copending application U.S. Ser. No. 07/748,302 In response to receiving the multi-sender JOIN command, each node joins the operation started by the initiating node.

Figure 3:
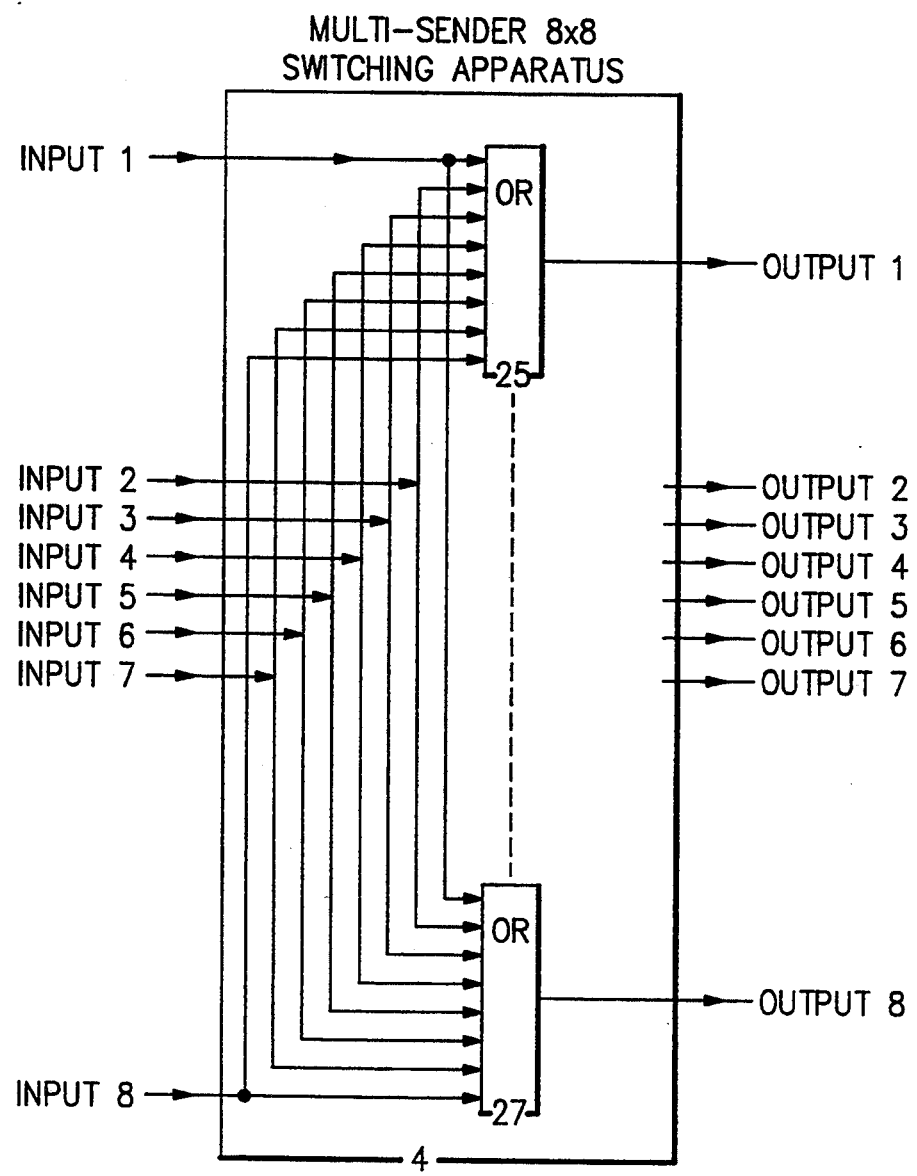
FIG. 3 illustrates the input ORing function provided by the multi-sender/switching apparatus and the network it comprises. Illustrated is how each apparatus logically ORs eight inputs and sends the same result to all eight outputs.

Next, every node sends the highest priority that it has available for any pending barrier synchronization or multi-sender operation to the network 20. It is possible that one, several, or many nodes can start barrier synchronization operation over network 20 simultaneously (or at about the same time). This is a legal occurrence. In this case all such contenders for network 20 will simultaneously begin establishing broadcast connections to network 20 at about the same time; these multiple transmissions may be asynchronous. In any event, only one final and consistent response occurs—all n processors become connected in the multi-sender and broadcast mode. Being connected in multi-sender and broadcast mode means that connections from every node to network 20 are all logically ORed together and provide identical data on every connection from the network back to all n nodes, as shown in FIG. 3. A typical stage of network 20 is shown by block 4, which is a multi-sender/switching apparatus as described in the above U.S. Ser. No. 07/748,302 and is implemented as an 8×8 asynchronous, unbuffered crossbar switch which is capable of connecting any of eight inputs to any of eight outputs. OR gates 25 and 27 show how the apparatus 4 individually ORs all eight inputs and transmits the OR of the inputs to all eight outputs such that all eight outputs see exactly the same value (the OR of the corresponding eight inputs). FIG. 3 illustrates how the OR function works for a single individual line coming from eight inputs and going to eight outputs. In reality, the apparatus 4 handles a total of 8 parallel information carrying data lines coming from each input and going to each output (byte wide paths). Each of the eight paths are implemented internally in apparatus 21 in the exact same manner as shown for the single lines; i.e., each of the eight lines has its own unique set of eight OR gates (like 25 and 27), which OR a corresponding set of eight input lines (one coming from each of eight inputs and going to a specific output). The result being that each apparatus 4 performs a total of eight different OR functions simultaneously and fans the result out to eight outputs which all see the eight OR values simultaneously. Note that the broadcast function totally uses all 8 n data interface lines to network 20 and all 8 n data interface lines from network 20.

Figure 4A:
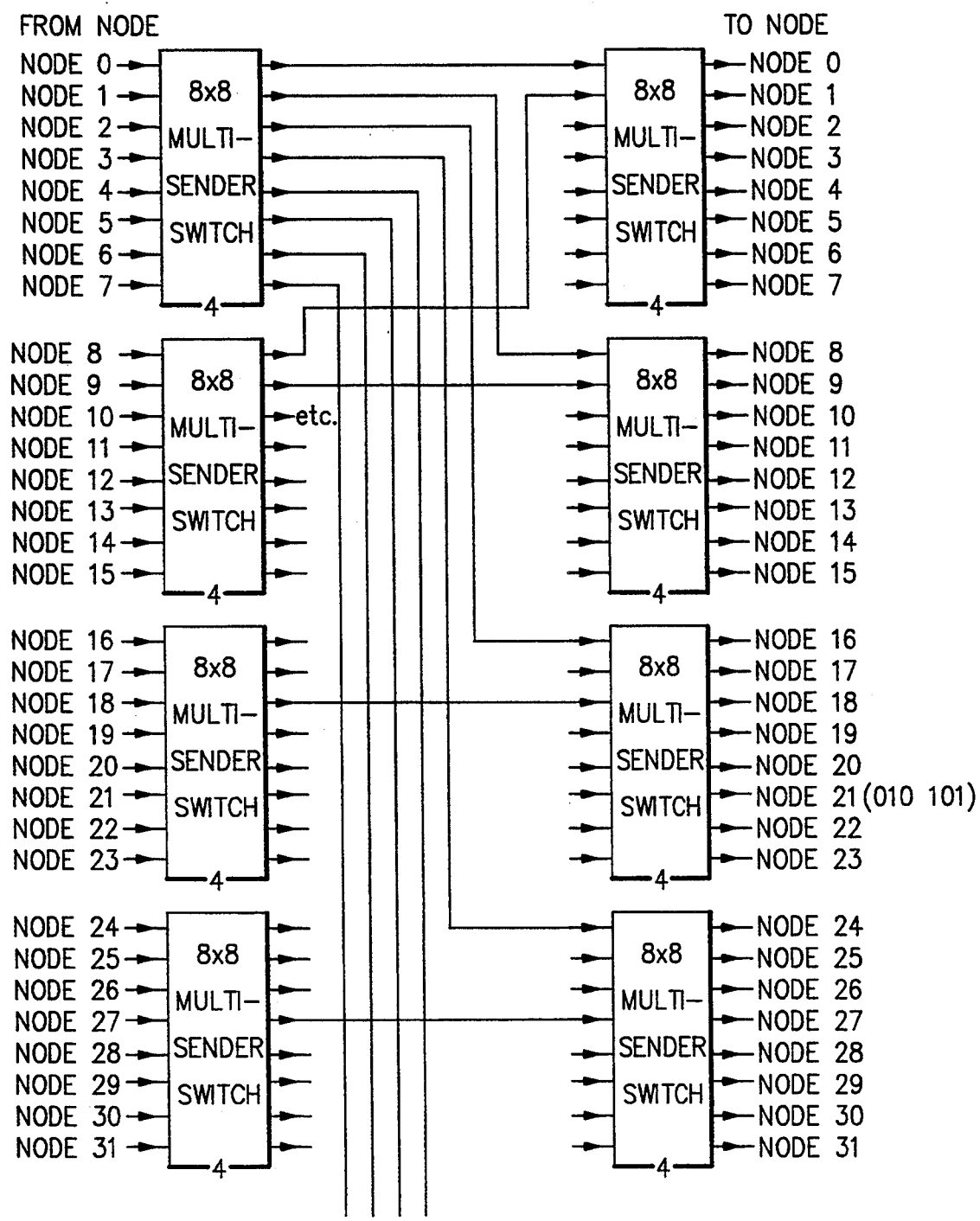
FIGS. 4, 4A, and 4B show a typical method for cascading the preferred 8×8 embodiment of the invention multi-sender/switching apparatus to accommodate systems having more than eight processing nodes.
Figures 4, 4A, 4B:
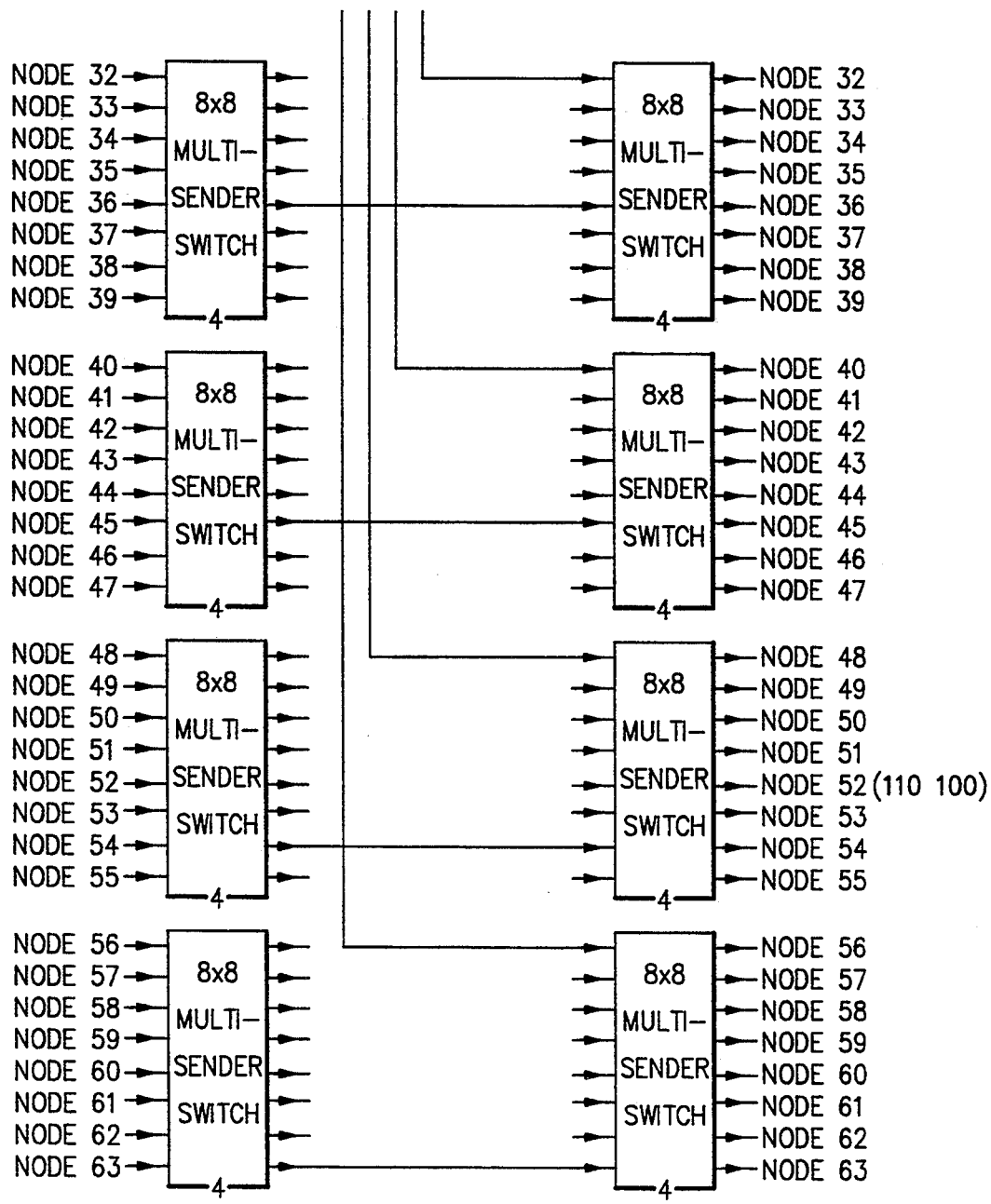

FIG. 4 shows how individual Multi-sender/switching apparatus 4 devices, like the one shown in FIG. 2, can be cascaded to increase the size of network 20 and to allow the connection to more than eight nodes. Referring to FIG. 4, sixteen apparatus 4 devices can be interconnected as shown to provide a two-stage network 20 which permits total interconnection among up to 64 nodes. Theoretically, there is no limit to the number of network stages or the number of nodes serviced; however, our preferred embodiment shall refer to FIG. 4 as the typical implementation of network 20 which is being described. The interfaces from each node are unique uni-directional and point-to-point wires that comprise the 12 signal lines (eight data and four control) shown by FIG. 2. The inputs to network 20 come from the left side of FIG. 4, where all 64 nodes interface to network 20—each interface using a unique set of the 12 signal lines. The outputs from network 20 come from the right side of FIG. 4, where network 20 sends data to all 64 nodes—each interface using a unique set of the 12 signal lines. Point-to-point wires between the two stages of multi-sender/switching apparatus 4 devices enable any node to be connected through paths established in network 20 to any of the 64 nodes including itself.

Figures 5, 5A, 5B:
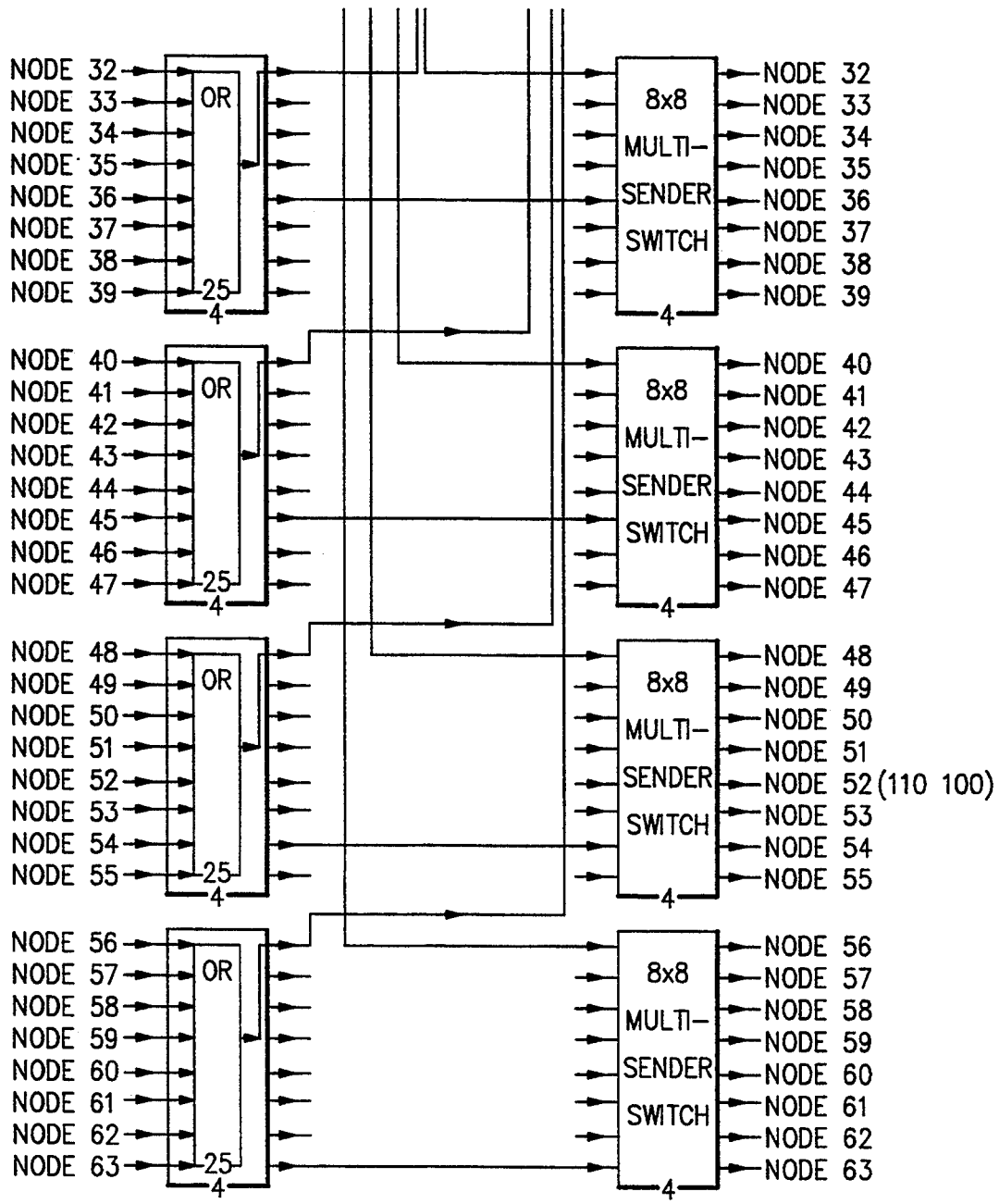
FIGS. 5, 5A, and 5B show how the network ORing function is cascaded across the stages of a multi-stage network as a means for ORing all 64 inputs and transmitting the result consistently and simultaneously to the desired nodes.

Referring to FIG. 5, a typical example is shown of how network 20 is capable of providing a means for extending the OR function associated with a single apparatus 4 device (as shown in FIG. 3) to encompass a cascaded OR function for the entire multi-stage network 20. The example in FIG. 5 show how one data line from each of eight input pods can be ORed in each of 8 apparatus 4 devices in the first stage of network 20 (shown on the left side of the figure), and how one line from each of the eight first stage apparatus 4 devices can be sent to each of eight apparatus 4 devices in the second stage (as illustrated by the top right second stage device), where the eight sets of eight ORed inputs are again ORed in the second stage to produce an output to node 0 which is the OR of the inputs from all 64 nodes as they enter network 20 from the left side of FIG. 5. In a similar manner to the way that node 0 receives the OR of all 64 inputs, all other nodes are capable of receiving the exact same 64-way OR function through network 20 simultaneously via 63 more OR 25 gates located in the second stage apparatus 4 devices (8 ORs per apparatus 4 as shown in FIG. 4). Also, this example only shows how 1 data line from each of 64 nodes can be ORed in network 20 and received by all 64 nodes; however, our invention supports eight data lines in and out of each node and apparatus 4 device. This means that in reality eight simultaneous 64-way OR functions are supported simultaneously in network 20 using a full 8-way parallel implementation as shown in FIG. 5. Network 20 supports simultaneously and individually the 64-way ORing and sending of 8 unique lines at a time from and to all 64 nodes.

Figure 6:
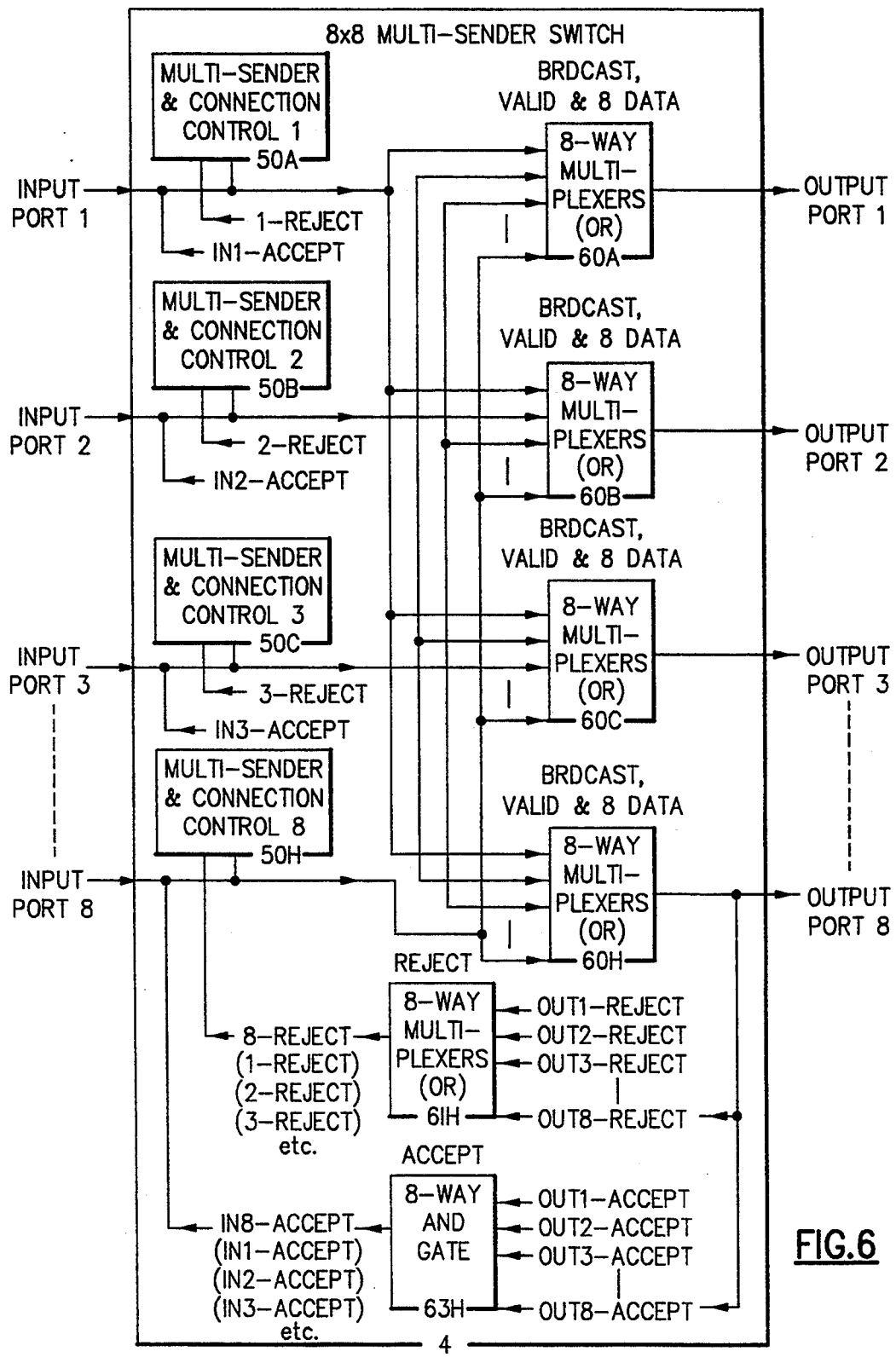
FIG. 6 shows a schematic block diagram of the simple data flow and control path implementations of the multi-sender/switching apparatus which comprises the network used for barrier synchronization.

Referring to FIG. 6, a functional diagram of the simple data flow across each multi-sender switching apparatus 4 is illustrated. The BRDCAST, VALID, and eight data lines at each input pod, inside the multi-sender switch and at each output pod are represented by a single line in FIG. 6 for simplicity. For instance, the BRDCAST, VALID, and eight data lines entering the multi-sender switch 4 at input pod 1 go to 9 functional blocks internal to apparatus 4; these are blocks 50A, and 60A to 60H. Block 50A makes the decision about which of the 8 possible output ports are to be connected to input port 1. The BRDCAST, VALID, and eight data lines from each input port go to each output multiplexer block (60A to 60H). This makes it possible to connect any input port to any output port. Each of the eight output multiplexer blocks (60A to 60H) implements the OR 25 function shown in FIG. 5 and is uniquely commanded from each of the 8 control blocks (50A to 50H) about which of the input port lines are to be ORed to its output port. For instance; control block 50A can command multiplexer 60C to connect input port 1 to output port 3; control block 50B can command multiplexer 60A to connect input port 2 to output port 1; control block 50C can command multiplexers 60B and 60D to connect input port 3 in multi-cast fashion to output ports 2 and 4. Multiple connections like these are capable of being established simultaneously or at different times.

At the same time that multiplexers 60A to 60H form connections to move VALID, BRDCAST, and data signals across the multi-sender switch 4 with a unidirectional signal flow from input port to output port, multiplexer 61H and AND gate 63H (typical implementations are shown by blocks 61H and 63H—similar blocks are associated with each input port) form signal connections for the REJECT and ACCEPT signals, respectively, with a signal flow in the opposite direction of output port to input port. These REJECT and ACCEPT signals provide a positive feedback indication to multi-sender switch 4 of actions taken by later multi-sender switch 4 stages in a cascaded network 20 or by the node receiving the BRDCAST, VALID, and data signals. A command or message being transmitted through multi-sender switch apparatus 4 over the 8 data signals under control of the VALID signal can be REJECTED by any network stage if it is unable to establish the commanded connection, or by the receiving node if it is not capable of receiving the message currently, or if it detects an error in the transmission. The receiving node also has the capability of confirming the arrival of a message correctly (without errors being detected) by pulsing the ACCEPT signal. Since the REJECT and ACCEPT signals go in the opposite direction of the data flow, they provide a means of reporting back a positive indication to the sender whether the attempted message transmission was received correctly or rejected.

Figure 7:
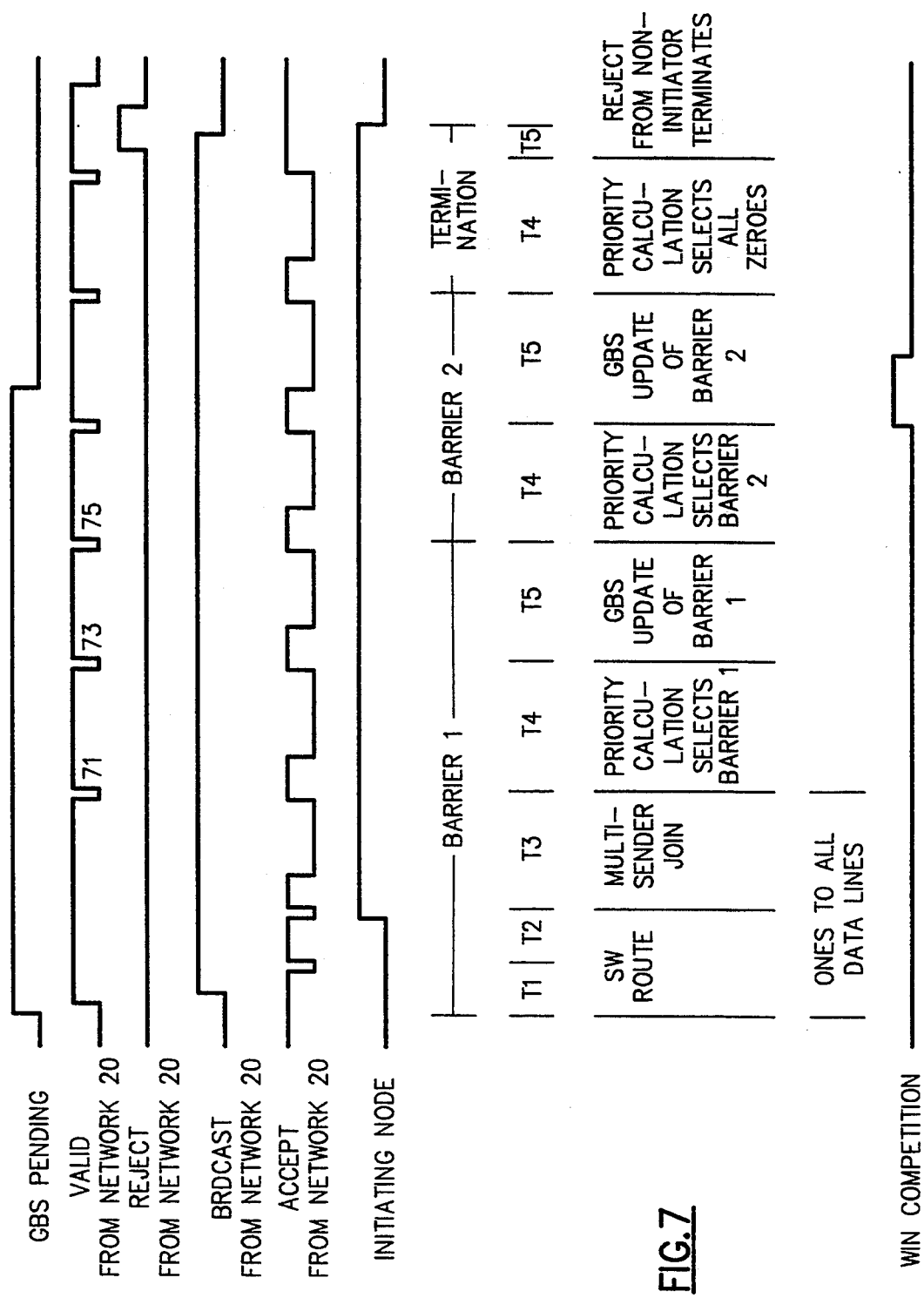
FIG. 7 illustrates a typical example of the SYNC-NET timing and the sequential steps involved in executing a barrier synchronization operation over the multi-stage network as related to the node which initiates the barrier synchronization operation.
Figure 8A:
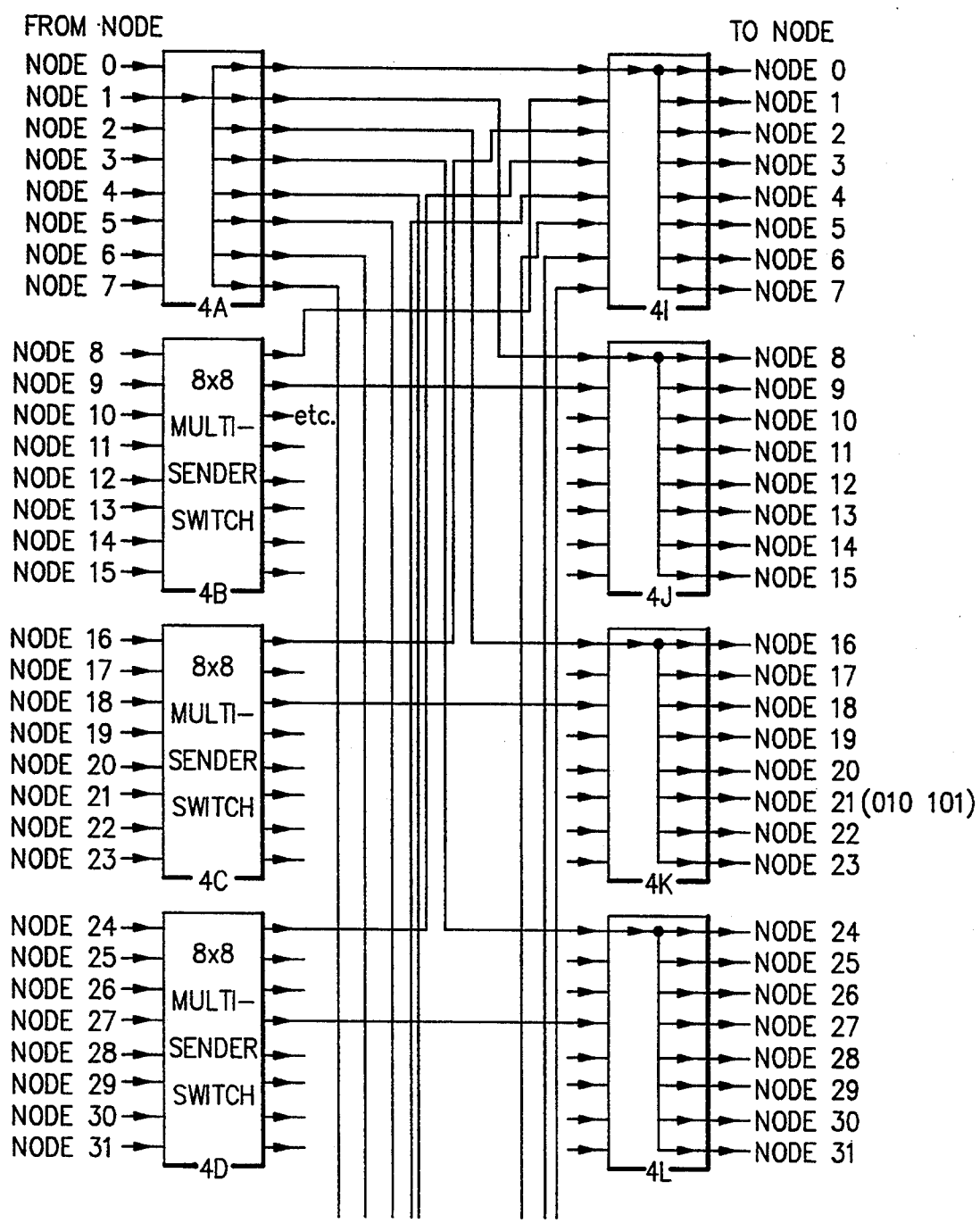
FIGS. 8, 8A, and 8B illustrate a typical broadcast example and the connections established in each multi-sender/switching apparatus comprising a two-stage interconnection network for connecting node 1 in broadcast fashion to all 64 nodes simultaneously.
Figures 8, 8A, 8B:
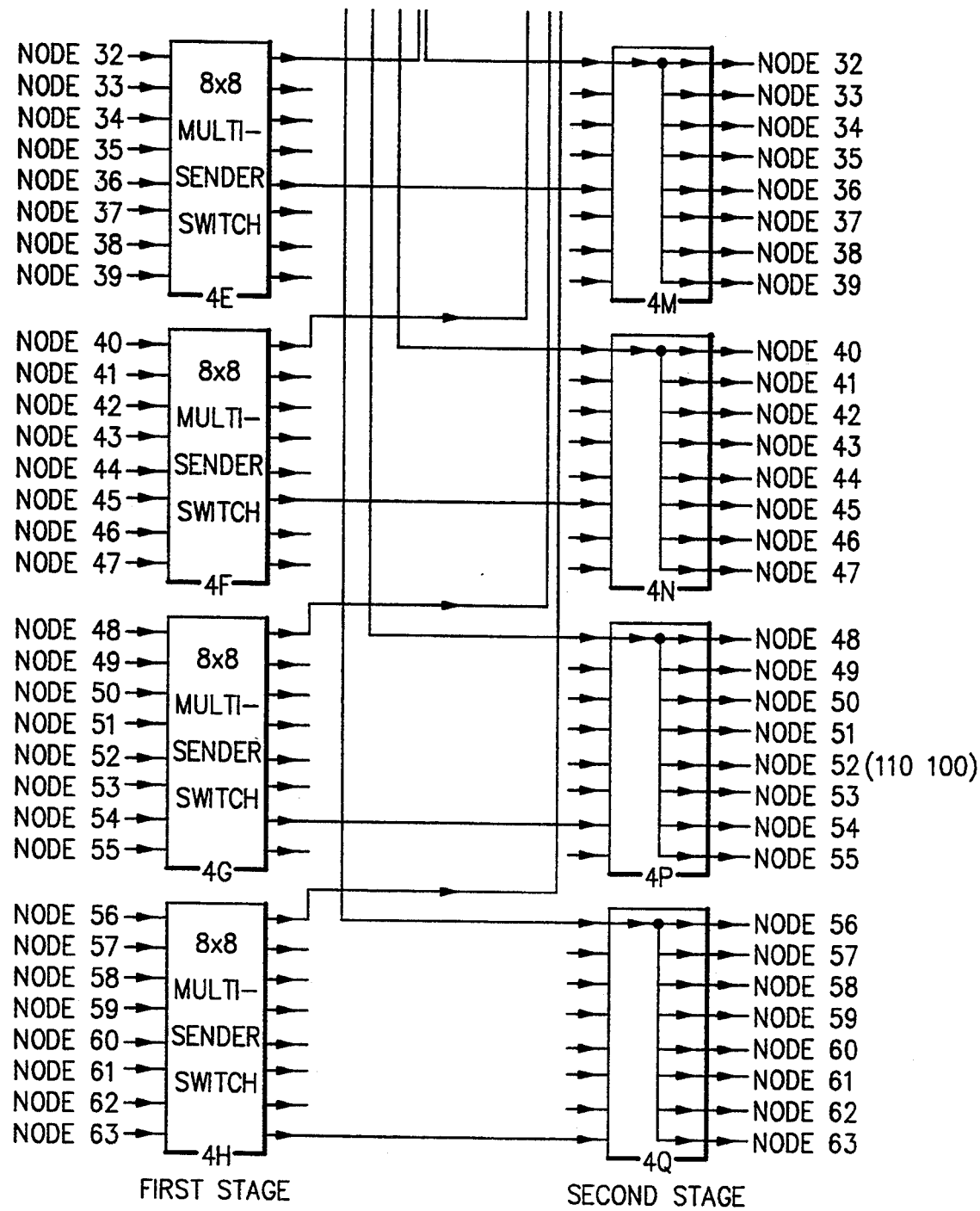

FIG. 7 shows an example of the over-all timing of the GBS operation as it is executed over the network 20 and initiated by a single node (node 1 for example). The GBS pending signal being set to a 1 indicates that node 1 has a pending GBS operation to perform over the network 20. The GBS operation is a multi-sender operation that is initiated by establishing broadcast connections from an initiating node to all nodes. The example involves 5 sequential timing steps T1 to T5 generated by an operation control counter and assumes the two-stage 8-bit wide data network 20 shown in FIGS. 4 and 5. During T1 and T2, node 1 establishes broadcast connections to all n nodes through network 20 as shown in FIG. 8. The broadcast connections are established by making the 8 stage 1 connections shown in FIG. 8 (top left) during T1 and the 64 stage 2 connections shown on the right side of FIG. 8 during T2. Node 1 establishes the broadcast connection to all nodes by issuing an all ones data pattern on the eight data lines it sends to the network for both times T1 and T2. The Multi-sender/switch apparatus 4 devices comprising network 20 recognize all ones at each stage as defining the broadcast connection (node 1 being OR connected to all outputs internal to the involved apparatus 4 devices at both stages one and two of network 20). As each stage of the network successfully establishes the commanded broadcast connections within network 20, the applicable Multi-sender/switch apparatus 4 devices issue negative pulses on the ACCEPT signal back to node 1 to indicate the successful connection. Note that the ACCEPT signal defaults to the one state so the signal must be driven negative and then back to positive to cause the ACCEPT signal to rise; it is the rise of the ACCEPT signal at node 1 that determines a positive feedback indication of acceptance.

Node 1 uses the first rise of the ACCEPT line to step the operation control counter from T1 to T2 and the second rise step to T3, as shown in FIG. 7. If node 1 gets ACCEPT signals returned at both T1 and T2, it knows that it is the initiating node and sets the INITIATING NODE signal with the concurrence of T2 and the rise of ACCEPT. Only one broadcast operation is allowed in network 20 at any given time so the very first broadcast operation to arrive at network 20 will receive two ACCEPT pulses. Any subsequent attempt to broadcast by another node after one broadcast is in progress in network 20 will receive a REJECT rather than an ACCEPT, thus two ACCEPT pulses (one for each stage of the network) indicates that the attempt to broadcast has been accepted, and if a multi-sender operation such as barrier synchronization is to follow, that the winner of the broadcast honors becomes the initiator of the multi-sender operation.

After node 1 has established its broadcast connection to all nodes, it transmits the multi-sender priority command (ones on all eight data lines) to all n nodes simultaneously during T3 and all nodes join the operation during T3. Joining the operation involves each node individually forming OR connections in the network such that its inputs are joined or ORed together with those from all other nodes so that all nodes are participating as multiple senders in the barrier synchronization operation. After joining the operation, each node must individually signify that it has successfully joined the operation by raising its ACCEPT interface signal. At the beginning of T3, each node drives its individual ACCEPT line negative and then raises the ACCEPT line when it has joined the operation. Multi-sender/switching apparatus 4 which comprises network 20 logically ANDs the ACCEPT signals from all n nodes such that when all n nodes have successfully joined the multi-sender operation, the initiating node (node 1) and all n nodes see the joint ACCEPT line rise as a positive acknowledgement of all nodes successfully joining the operation. Node 1 then steps the operation to T4 by pulsing the VALID interface line of FIG. 2 to a zero for one clock time 71. All n nodes see this pulse to zero on VALID at about the same time and step in synchronization to T4 while at the same time driving their individual ACCEPT lines negative again and causing the network ANDed composite of the ACCEPT lines to go to zero—which is noted by all n nodes simultaneously.

During T4 every node having a pending GBS or multi-sender operation pending sends the priority value of its pending operation to network 20 in multi-sender fashion. For the GBS operation, this is the 8-bit value which defines the selected set of eight barriers to be updated (the contents of register 6 of FIG. 1). These 8-bit values are driven by each node onto the individual data lines that connect each node to network 20. If a node has no pending operation, it drives an all zeroes value to the network 20 (thus all zeroes is not a legal barrier set number, but instead is a no operation pending indication). The apparatus 4 comprising network 20 logically ORs all of the individual 8-bit values and sends the result to every node so that all nodes see on the data lines coming from the network 20 a logical ORing of all pending priorities. The next action, which also occurs during T4, is to resolve priority among the various contenders and decide on one (the highest priority) to be processed by this operation. The priority is resolved by assigning the highest priority to the all ones value and descending priority until the lowest priority of all zeroes (no-op) is reached.

Standard combinational logic for resolving priority is used over the network to decide on the highest priority during any particular T4 time. The way this works is that every node which sent a non-zero priority to the network 20 examines the ORed value it receives back from the network 20. It compares the 8-bit priority value that it transmitted to the ORed value it receives back on a bit by bit basis, starting with the high order bit 0 (DATA 0). If the bits disagree, the node realizes that it is not the highest priority requestor, and it changes the value of the priority that it is transmitting to the network 20 to all zeroes and disables itself from contending any further during this particular T4. However, it will await a subsequent T4 and contend again later. If the two bit 0s being compared agree, the node knows it is still in the competition and compares the next bits on the DATA 1 lines. This continues with the lower priority contenders dropping out of the competition until the combinational logic settles out leaving only the highest priority contender or contenders remaining and driving the same one priority value to the network 20. The winner (or winners) will see an identical comparison between the priority value that they are driving to the network 20 and the priority value that they are receiving back from the network 20. This is the winning priority value—the highest pending value presently available. As every node drops out of the competition or sees an identical compare, it activates its individual ACCEPT line to network 20 as an indication that it has completed its part in the priority calculation being made over network 20. When all nodes have completed the priority calculation and raised their ACCEPT signals, the multi-sender/switching apparatus 4 which comprises network 20 logically ANDs the ACCEPT signals from all n nodes such that the initiating node (node 1) and all n nodes see the ACCEPT line from network 20 rise as a positive acknowledgement that the priority calculation has completed successfully. Node 1 then steps the operation to T5 by pulsing the VALID interface line of FIG. 2 to a zero for one clock time 73. All n nodes see this pulse to zero on VALID at about the same time and step in synchronization to T5 while at the same time driving their individual ACCEPT lines negative and causing the network 20 ANDed composite of the ACCEPT lines to go to zero—which is noted by all n nodes simultaneously. Additionally, at the end of time T4, each node notes the winning priority value an enables itself to participate as a multi-sender during T5 in the winning GBS or other multi-sender operation.

At the end of T4, either one sender or several senders having the same priority have won the multi-sender honors and defined what operation will be performed during T5. Thus, several nodes having the same barrier synchronization operation pending can participate in and be satisfied with one shared barrier synchronization operation. During T5, every node places on the network the 8-bits from its Local Barrier Status Register 8 from FIG. 1 that correspond the barrier set selected by the present winning priority value. The network broadcast function, as shown in FIG. 3, logically ORs the eight individual data lines from all n processors. Since a logical one will dominate the OR function, any node which transmits a ONE to the network (for a barrier associated with a given data line) will cause the network output associated with that data line to go to a ONE. A ONE on a data line indicates that all nodes have not yet reached the individual barrier. If all n nodes send logical ZEROES to the network for a barrier associated with a given data line, the network output associated with that data line goes to a ZERO, indicating that all nodes have reached the individual barrier. When all nodes have sent their local barrier status to network 20, each individually raises its ACCEPT signal. The multi-sender/switching apparatus 4 which comprises network 20 logically ANDs the ACCEPT signals from all n nodes such that the initiating node (node 1) and all n nodes see the ACCEPT line from network 20 rise as a positive acknowledgement that the GBS calculation has completed successfully. Node 1 then steps the operation by pulsing the VALID interface line of FIG. 2 to a zero for one clock time 75. At the end of time T5, each node notes the newly calculated GBS status and updates its individual copy of the GBS register 9 from the calculated value it receives from network 20. All n nodes see pulse 75 on VALID at about the same time and step in synchronization to the next time (T4), while at the same time driving their individual ACCEPT lines negative.

After T5, the operation control counter branches back to T4 to either terminate the multi-sender operation, if no further GBS or multi-sender operations are available at this time, or to perform the next GBS or multi-sender operation if there are more pending at this time.

The example shown in FIG. 7 assumes that the initiating node 1 lost the first priority competition and did not have its pending GBS operation satisfied by the first T4 and T5 sequence. Thus, in our example the second T4 period allows node 1 to take over the existing network connections and use them from the second T4 without having to recycle through times T1–T3 to reestablish these connections. At the new T4, all nodes still wishing to contend further put back onto the network 20 their individual priority and a second down-selection of the remaining highest priority takes place in a manner identical to that which took place at the previous T4, except now there is a different winning priority selected. This can be continued in the same manner until all nodes requiring the multi-sender connections have been satisfied and established network connections can be broken. For the example shown in FIG. 7, assume that node 1 is the only node contending during the second T4 interval. Therefore, node 1 wins the second T4 priority competition by detecting a match between the priority it is sending and the composite priority that it receives back; this leads to the setting of the node 1 WIN COMPETITION signal as shown in FIG. 7. The WIN COMPETITION signal and the updating of the GBS status for node 1 at the second T5 satisfy the node 1 pending GBS requirement and cause the GBS PENDING signal to be reset.

In our example, during the third T4 period there are no further multi-sender operations pending so all multi-sender nodes transmit all zeroes to network 20 during the third T4 to indicate that they have no further pending operations to perform. The composite priority therefore from network 20 becomes all zeroes indicating the lowest priority of NO-OP. All non-initiating nodes involved in the multi-sender operation then detect this case and respond by rejecting T5; i.e., by issuing a REJECT signal to network 20. Network 20 ORs any individual REJECT signal into a composite REJECT signal that it transmits simultaneously to all 64 nodes. All nodes, including the initiating node, see the composite REJECT signal from network 20 and respond by deactivating all its interface signals to network 20. This has a rippling affect through the network which causes all network connections to break and network 20 to return to the IDLE state ready to perform further commanded connections of any type supported.

There are several exception conditions that can occur and cause the GBS operation to be terminated. If T3, T4, or T5 does not get an ACCEPT response from all nodes, the initiating node 1 will time-out after a predetermined time interval and terminate the operation by resetting all of its interface signals. Also, any receiving node can terminate the GBS operation by issuing the REJECT interface signal of FIG. 2 if it detects an error, all zeroes composite priority, or an exception condition. The REJECT conditions are logically ORed in the multi-sender/switching apparatus 4 of network 20 so that any one REJECT signal from any node will cause the operation to terminate. The initiating node can retry any terminated or REJECTed GBS operation (except NO-OP) at any time.

Figure 9:
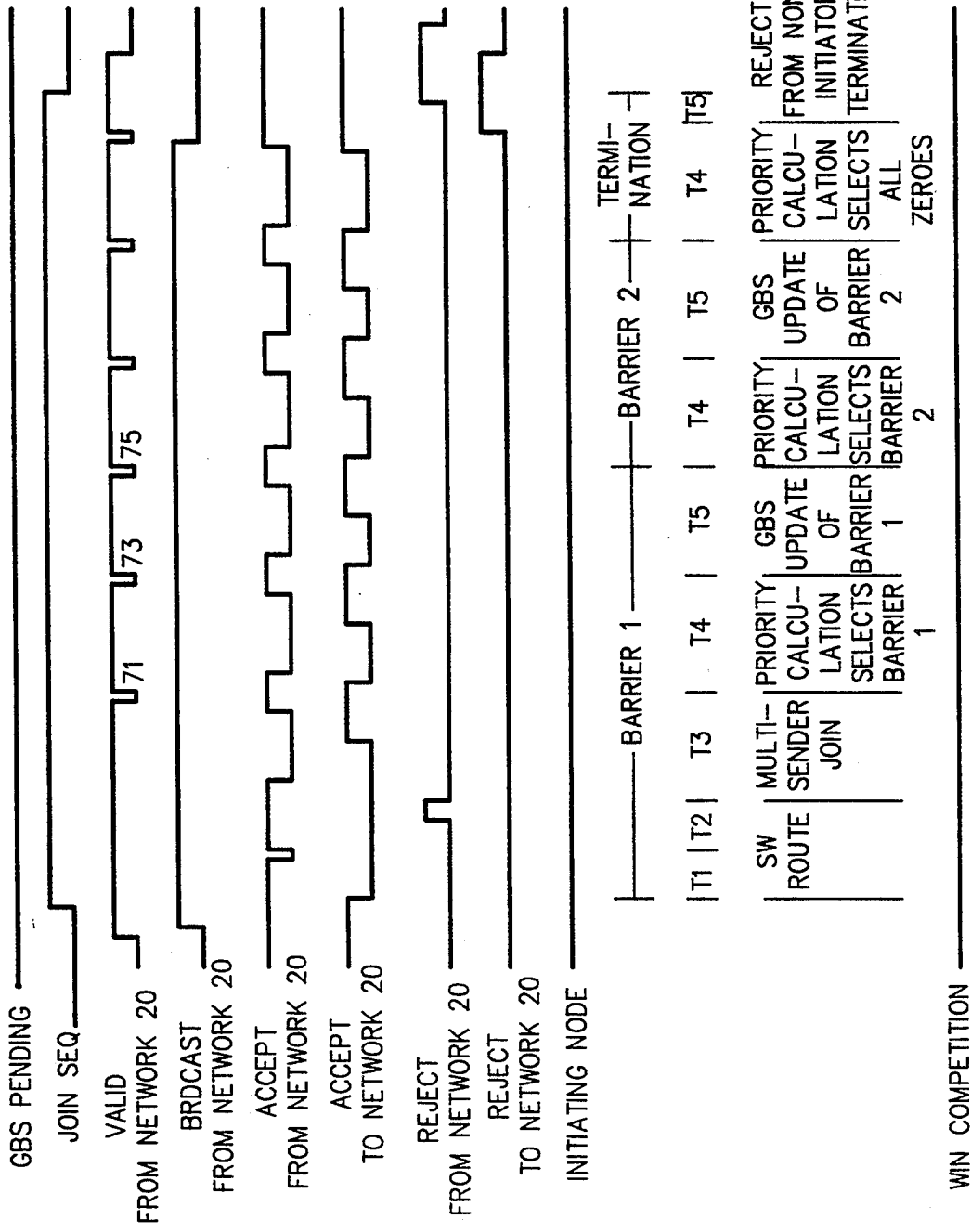
FIG. 9 illustrates a typical example of the SYNC-NET timing and the sequential steps involved in executing a barrier synchronization operation over the multi-stage network as related to the nodes which join and participate in the multi-sender operation.

Referring to FIG. 9, a further example of the over-all timing of the GBS operation as it is executed over the network 20 and responded to by a typical joining node (all other nodes except node 1 in the example of FIG. 7). The GBS pending signal is not set in a joining node and remains at a 0 to indicate that the node has no pending GBS operations to perform over the network 20. The joining node will not have any GBS operations to initiate at this time, but it will join and become involved in GBS operations started by other nodes. The first indication that a joining node receives of another node starting a GBS operation is that the incoming VALID and BRDCAST lines from network 20 go active as shown in FIG. 9. This means that the initiating node has progressed to T3, established its broadcast connection through both stages of the network 20, and sent the JOIN command (all ones) to the network 20. The joining node decodes the 8 data lines it is receiving from the network 20 as being all ONES and sets the JOIN SEQ signal. The JOIN SEQ signal starts the joining node stepping through its own five sequential timing steps (T1 to T5) coming from its individual operation control counter; these are the exact same steps it would have progressed through if it had been the initiating node. The JOIN SEQ signal also immediately causes the joining node to deactivate its ACCEPT signal to network 20 to indicate that it has not yet joined the multi-sender operation.

It is necessary for a joining node to establish some connections in the network 20. Referring to FIG. 8, it can be seen that the initiating node 1 did not establish full multi-sender connections in the network—actually node 1 made broadcast connections in nine of the sixteen multi-sender/switching apparatus 4 devices. Therefore, a joining node (node 15 for instance) has to establish some of its own multi-sender connections. In the first stage of the network 20 coming from node 15 (block 4B in FIG. 8) no connections have been made at all so node 15 must establish a broadcast connection in the first stage multi-sender/switching apparatus 4B connecting node 15 to all eight outputs, similar to the node 1 connections to all eight outputs in the first stage multi-sender/switching apparatus 4A. Node 15 is shown to make the desired connections in FIG. 10 block 4B. In the 8 second stage multi-sender/switching apparatus 4I to 4Q devices, the connection from node 15 comes in on the second input port from the top left at all 8 devices as shown in FIG. 8. There has been no previous connection established here either by node 1 in FIG. 8 so node 15 has to make 1 connection in each of the 8 second stage devices 41 to 4Q as shown in FIG. 10 to join the broadcast connections already set-up in the second network 20 stage by the initiating node.

Figure 10A:
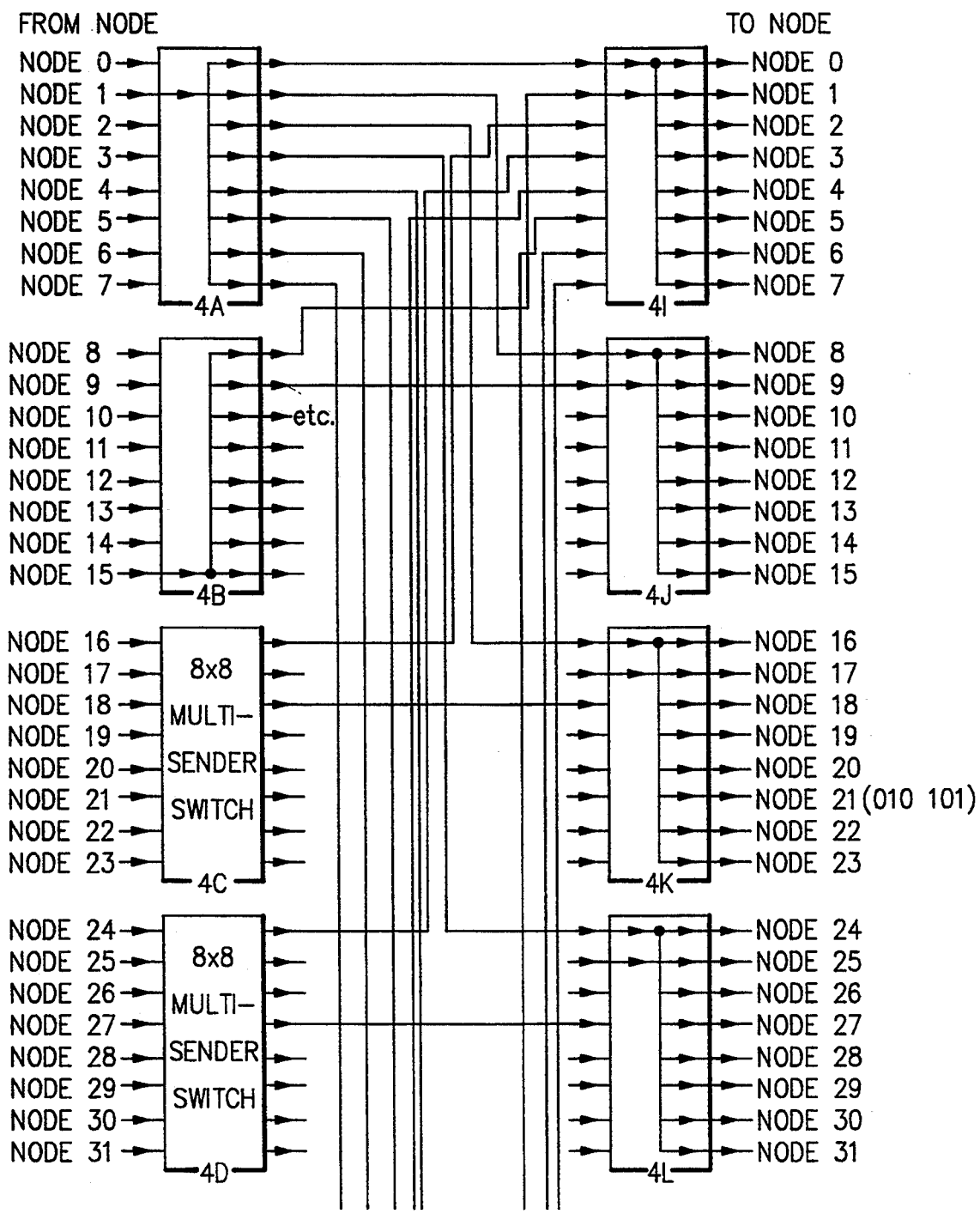
FIGS. 10, 10A, and 10B illustrate a typical multi-sender JOIN example and the connections established in each multi-sender/switching apparatus comprising a two-stage interconnection network for connecting nodes 1 and 15 in broadcast fashion to all 64 nodes simultaneously.
Figures 10, 10B:
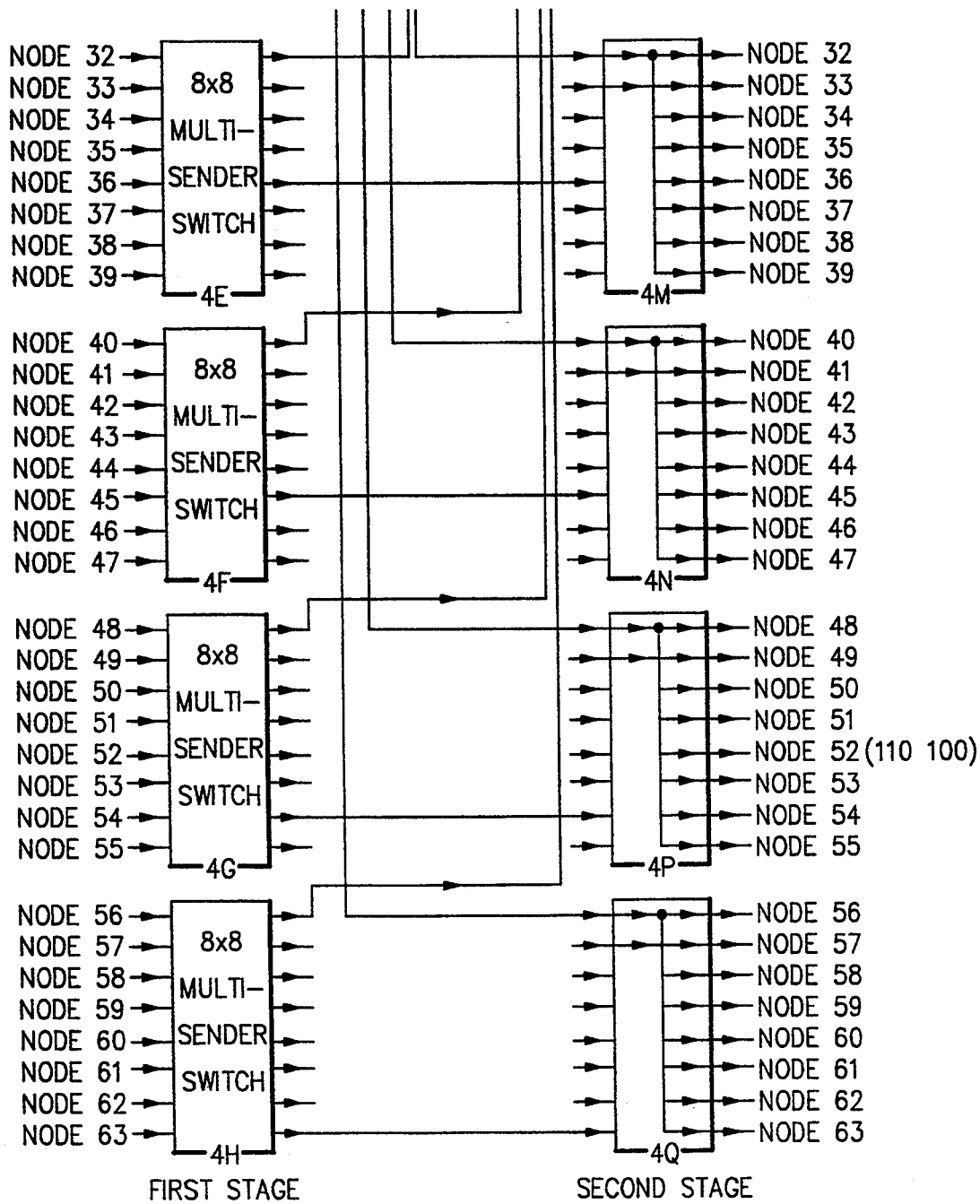

During T1 and T2, the joining node 15 establishes broadcast connections to all n nodes through network 20 as shown in FIG. 10, making the stage 1 connections during T1 and the stage 2 connections during T2. The joining node will not be successful at establishing a full broadcast connection because there is only one such connection allowed in the network 20 at any given time, and this has already been established by the initiating node. However, the joining node attempting the broadcast will cause it to be connected in to the present broadcast as a multi-sender joining the operation if the joining node responds with a special sequence when its broadcast attempt gets rejected. The details of the JOIN sequence and how it is implemented at the multi-sender/switching apparatus 4 is described in detail in U.S. Ser. No. 07/748,302. The example in FIG. 9 shows typically how the joining node gets a REJECT back from its broadcast attempt either during T1 or T2. In the example of node 15, no previous broadcast is established in the first stage of network 20 (block 4B of FIG. 8) so node 15's broadcast attempt during T1 gets ACCEPTed as shown in FIG. 9 and a broadcast connection is then established in the first stage from node 15 to all eight outputs as shown by block 4B in FIG. 10. However, all network 20 second stage devices 4I to 4Q already have broadcast operations established in FIG. 8 and, thus, node 15's broadcast attempt at T2 is REJECTed as shown in FIG. 9. Subsequently, if node 14 tried to establish a broadcast connection to block 4B in FIG. 10, it would be rejected at T1, because node 15 already has a broadcast pending in the first stage device 4B. Thus, the joining node's attempt can either be REJECTed during T1 or T2. In either case, the joining node after being rejected drops off its transmitting interface to network 20 temporarily, except that it leaves the BRDCAST active (as shown in FIG. 9) to indicate that it wishes to JOIN the broadcast in progress. The multi-sender/switching apparatus 4 devices recognize this command from the joining node and immediately connected it into the broadcast in progress at all stages. Special sequencing logic causes the control counter in the joining node to step from a REJECT given at either T1 or T2 to force state T3. This causes the joining node to catch up to the initiating node which is already at T3 and waiting for the other nodes to JOIN. The joining node, when it arrives at T3, immediately raises its ACCEPT signal to network 20 to indicate that it has successfully joined the broadcast at T3.

Figure 11A:
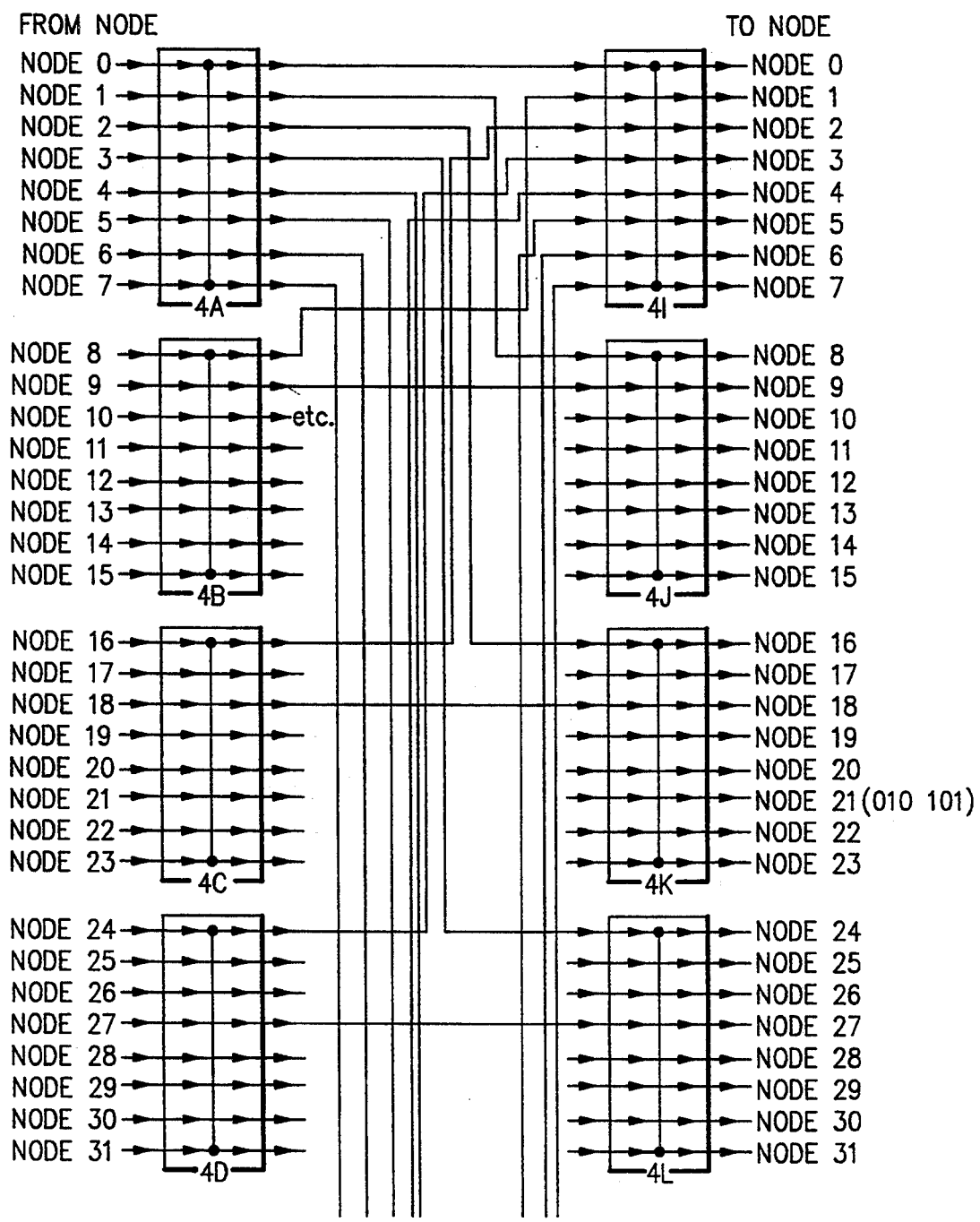
FIGS. 11, 11A, and 11B, illustrate a full multi-sender connection example and shows the connections established in each multi-sender/switching apparatus comprising a two-stage interconnection network for connecting all 64 nodes in multi-sender and broadcast fashion to all 64 nodes simultaneously.
Figures 11, 11B:
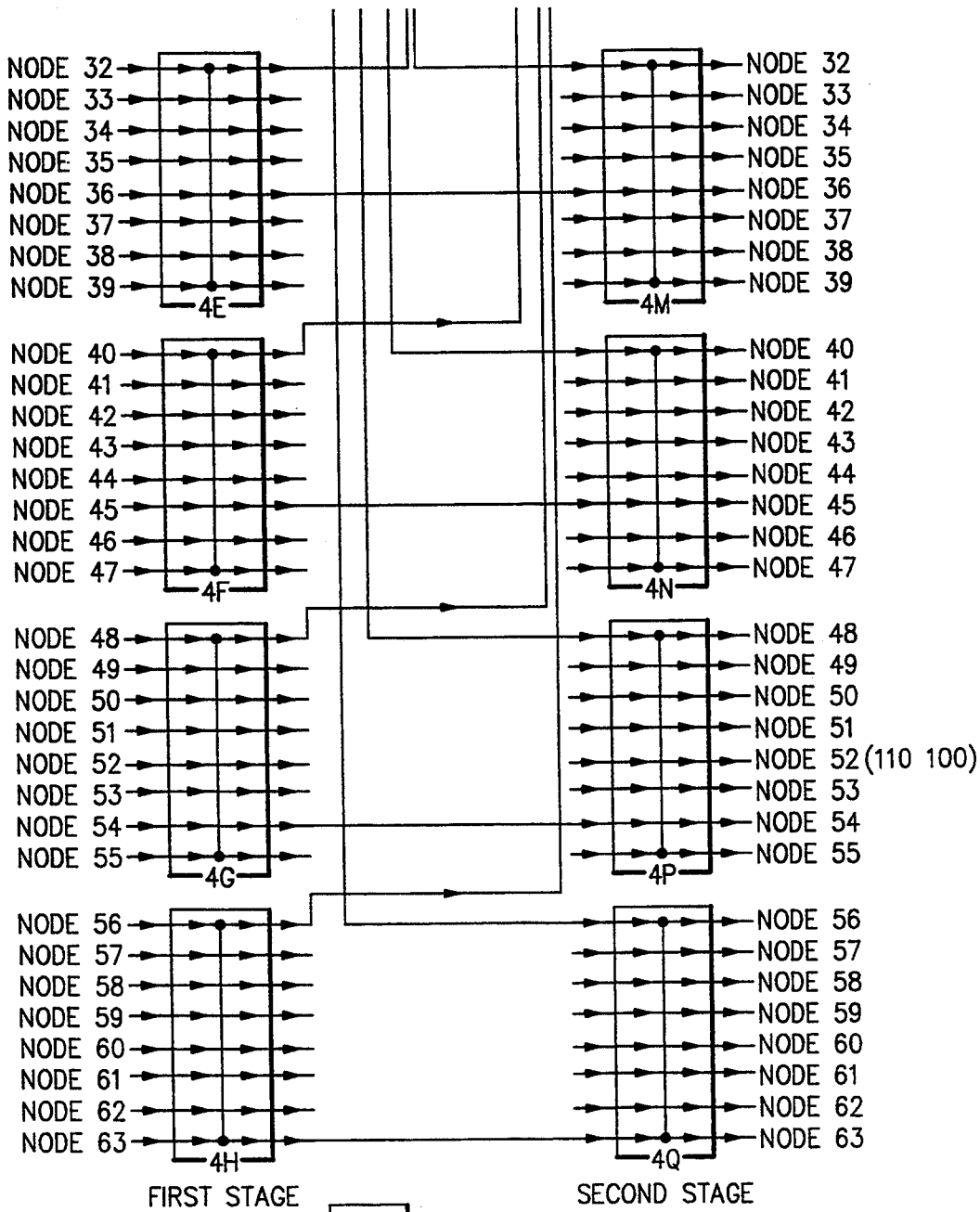

When all 63 joining nodes have joined the operation in progress, the full multi-sender interconnection is established through network 20 as shown in FIG. 11. The vertical line down the center of each device 4 in FIG. 11 is a symbol indicating that all eight input ports of the device have been logically ORed and sent to all eight output ports of the device. The network 20 has assumed the connections shown in FIG. 11 at the end of T3 when all the individual ACCEPT signals have been activated and lead to pulse 71 of FIGS. 7 and 9 on the VALID signal. From this point on the connections shown in FIG. 11 are maintained until the present operation is terminated.

Also from this point, the joining node acts very much like the initiating node and steps in sequence with the initiating node based on pulses 71, 73, and 75 that it receives from the initiating node. FIG. 9 shows that the joining node merely supports the multi-sender operations being performed over the network 20; it never sets its INITIATING NODE or WIN COMPETITION signals, because it has no pending GBS operation. However, the joining node during the third T4 period recognizes the all zeroes priority value and issues the REJECT signal to network 20; this signal propagates through network 20 and a composite and delayed REJECT signal from network 20 arrives at all nodes as shown in FIG. 9 and causes the operation to terminate.

Figure 12A:
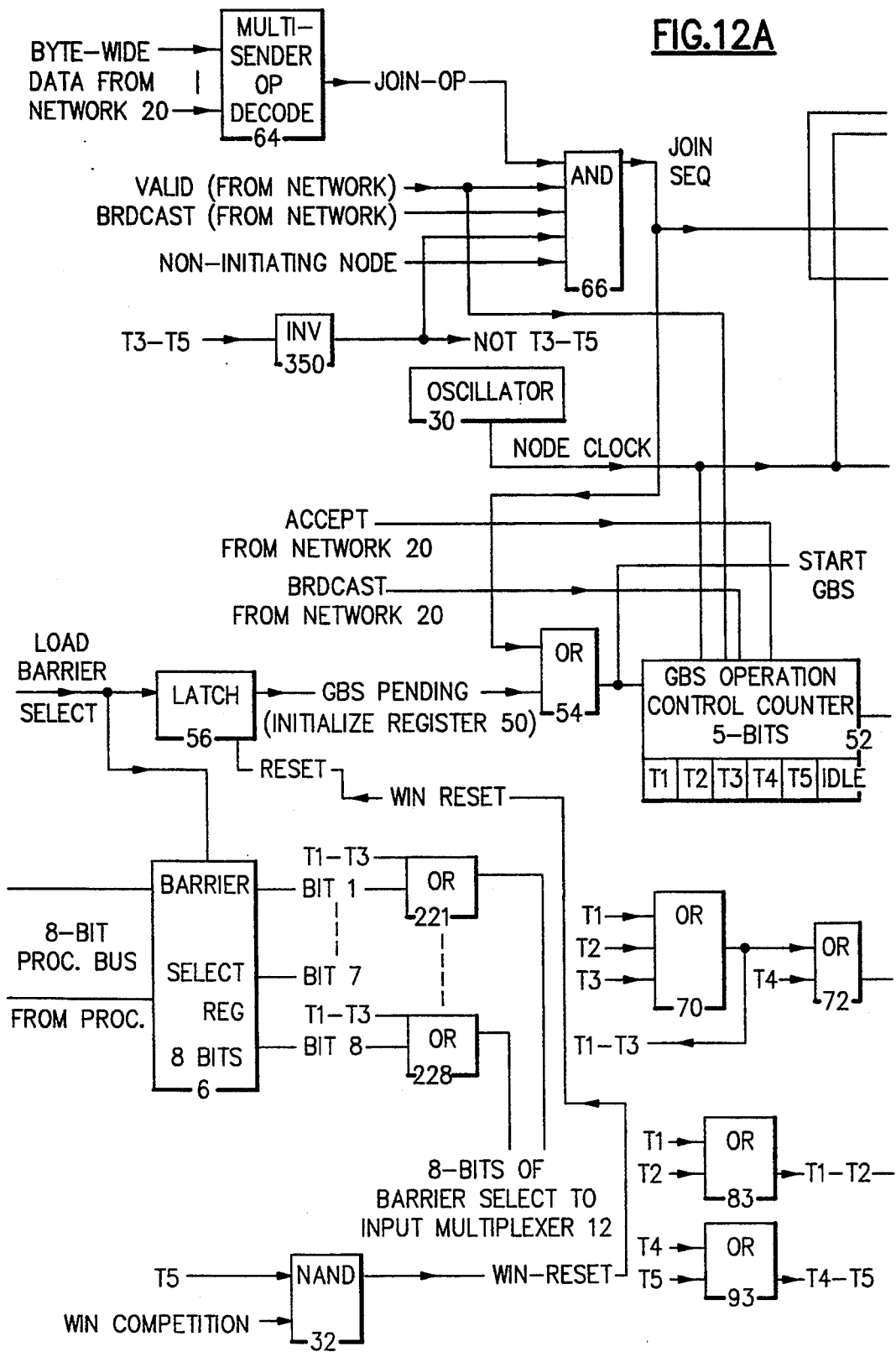
Figure 13A:
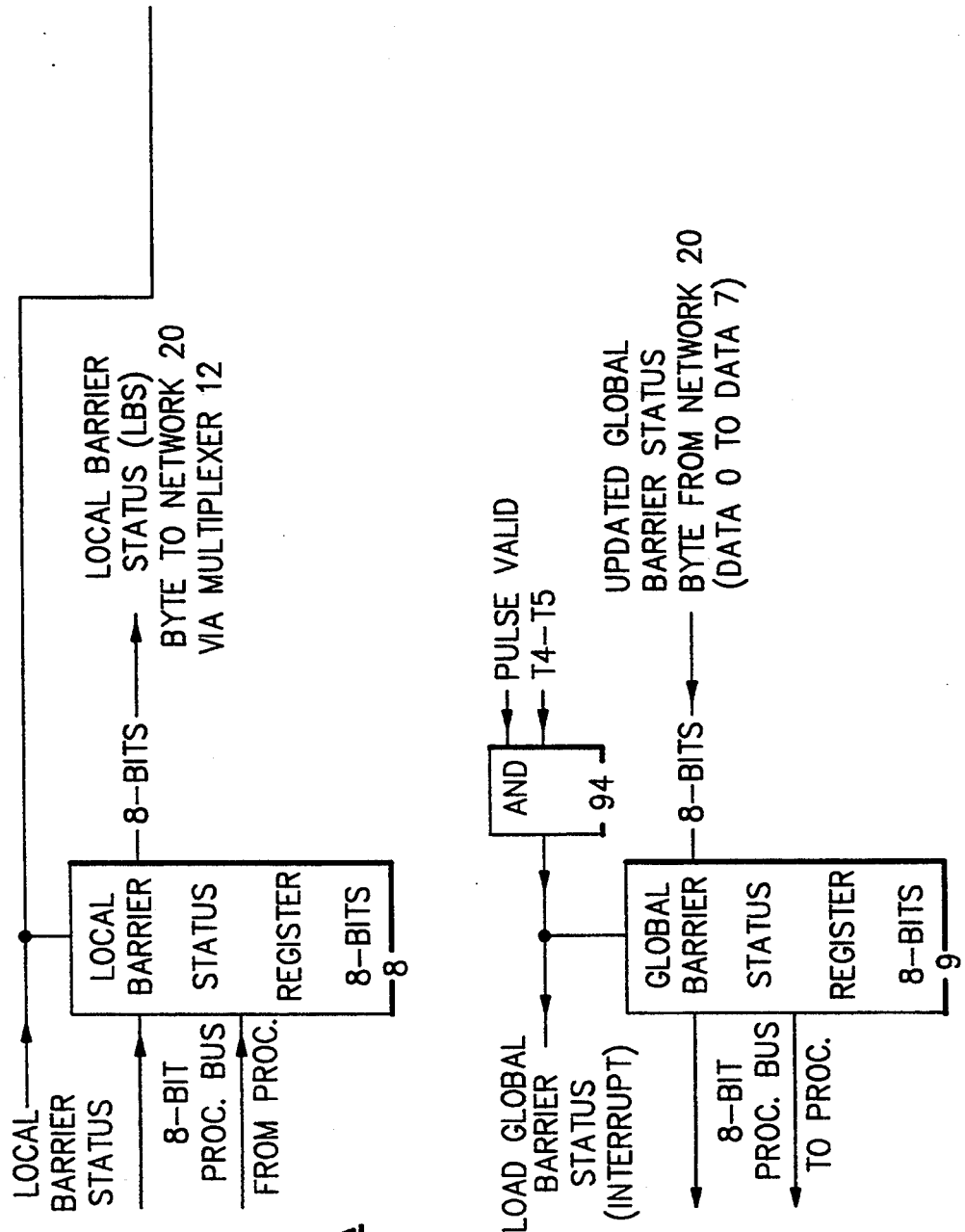
Figure 13B:
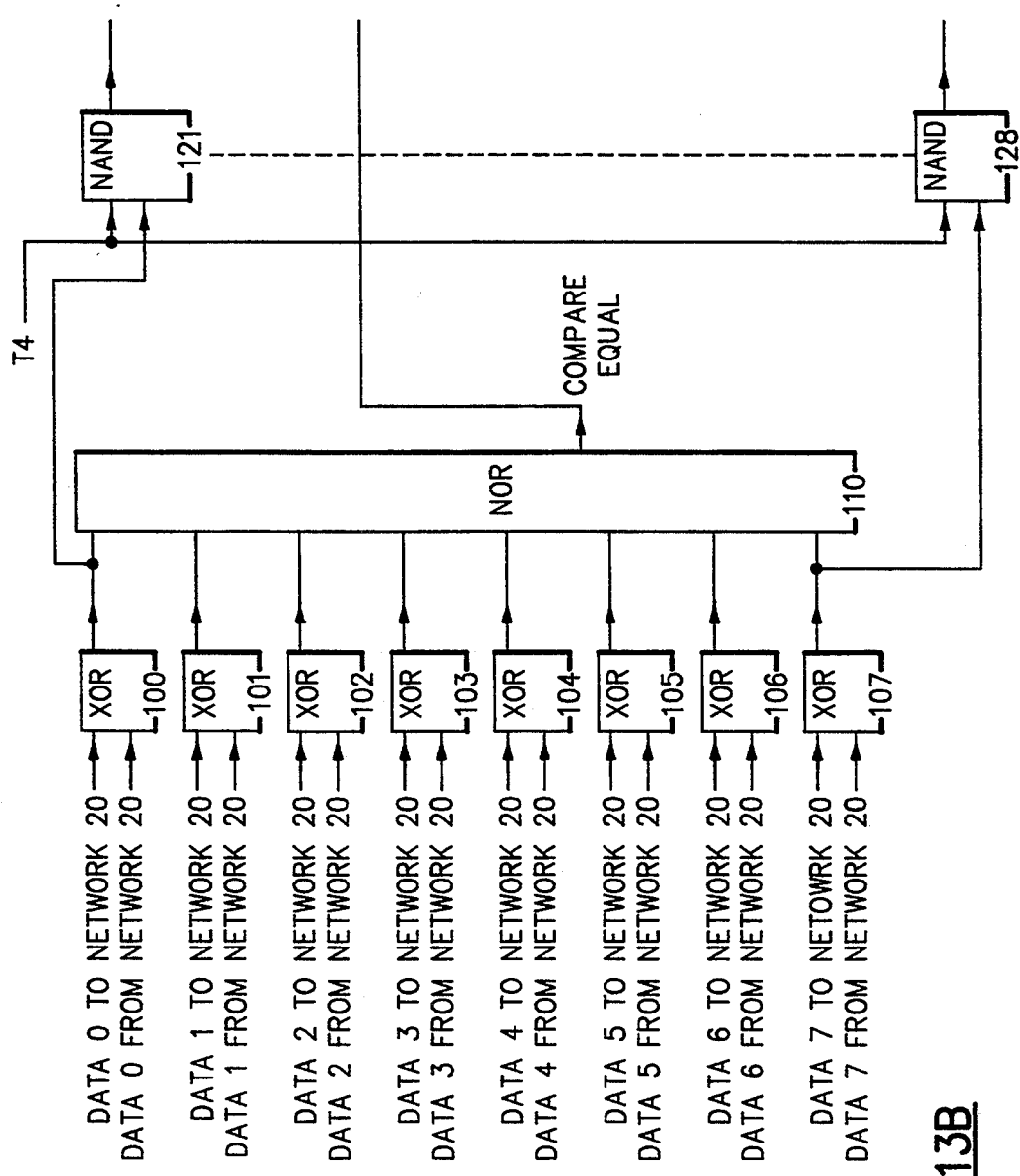
Figure 13C:
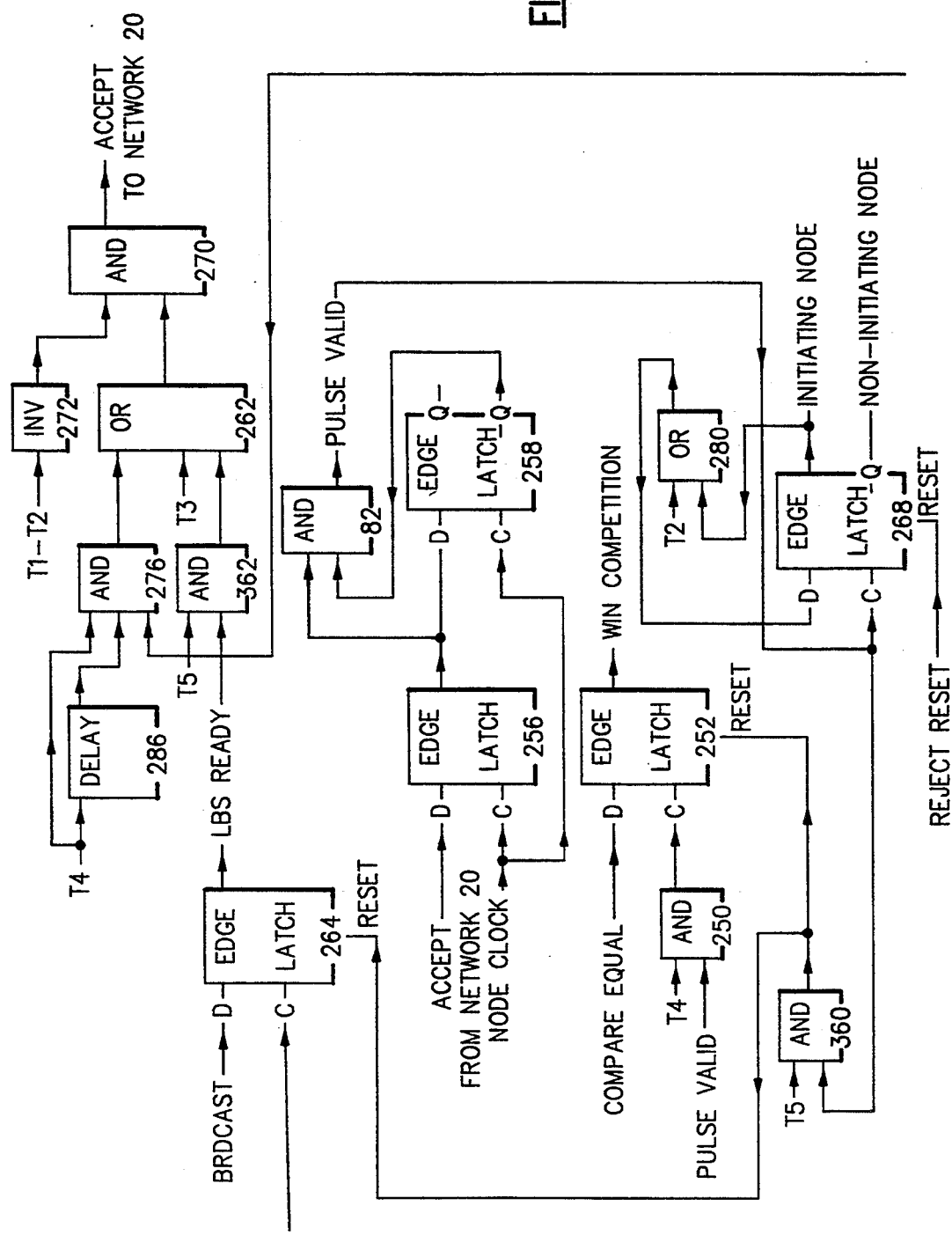

Referring to FIG. 12 and 13, the detailed logic to implement the GBS function at each node is shown. Each node must have the capability of being an initiating node at times and a joining node at other times; therefore, the logic shown in FIG. 12 and 13 is a common set of logic which is capable of performing both initiating node and joining node sequences on a mutually exclusive basis. The SYNC-NET operation begins with the node processor 1 sending a LOAD BARRIER SELECT line plus 8 bits of command data to register 6 in FIG. 12. The 8-bit command is stored in register 6 and defines the set of eight barriers to be updated with regard to GBS. At the same time register 6 is loaded, latch 56 records that a GBS operation is pending (GBS PENDING). Latch 56 immediately begins the GBS operation through OR gate 54 (START GBS) which sets T1 in Operation Control Counter 52. T1 leads to the setting of the BRDCAST and VALID signals to network 20 and sends all ONES on the eight data lines to the network to command the broadcast connection. This is accomplished by the T1 signal propagating through OR gates 83 and 99 to set latch 36 which sets in synchronization with the fall of the local NODE CLOCK from Oscillator 30. Latch 36's being set raises the VALID line to network 20 through AND gate 34 and causes latch 90 to set at the rise of the next NODE CLOCK. This causes the BRDCAST signal to rise to the network 20 one half clock time after-latch 36 sets by enabling latch 90 to set through OR gate 69 and propagating the latch 90 output to the network 20. OR gates 221 to 228 cause an all ones value to be sent to multiplexer 12 (FIG. 1) during times T1, T2, and T3 for the purpose of commanding a broadcast during times T1 and T2 to the two stage network 20, and to command the multi-sender join operation during time T3. The outputs of gates 221 to 228 are subsequently forwarded to the network through gates 131 to 138 in FIG. 13.

Timing signals T1 and T2 feed into latch 36 through OR gate 83 and along with the INITIATING NODE signal in gate 99 to keep VALID active from the initiating node for the duration of the operation. Gate 99 holds latch 36 reset if the node is not the initiator (a joining node) of the GBS operation, except for times T1 and T2 when the joining node attempts a broadcast and joins the operation in progress. If REJECT is returned from network 20, it terminates VALID directly and causes a force to time T3 through AND gate 85 if a JOIN sequence is active. Otherwise, REJECT terminates the operation by resetting VALID and BRDCAST to the network 20.

The operation control counter 52 advances from T1 to T2 to T3 every time it receives a rising edge on the composite ACCEPT interface line coming from network 20. The rising edge of the incoming ACCEPT signal also causes the VALID signal 34 to the network 20 to pulse for times T3 to T5. This is accomplished by latches 256 and 258 ( FIG. 13) which sample the ACCEPT from network 20 based on a high frequency NODE CLOCK generated by oscillator 30 ( FIG. 12). Gate 82 generates a pulse that is one clock time wide based on the condition that ACCEPT has just arrived from network 20 and has set latch 256 but has not yet set latch 258. One clock time later latch 258 will set, causing gate 82 to deactivate. Therefore, the PULSE VALID signal 82 is active for 1 clock time only. The pulse generated by gate 82 is used to pulse the VALID signal from the initiating node to network 20 through AND gate 34.

BRDCAST is generated to network 20 one half clock later than VALID through Latch 90. Once set latch 90 remains active for GBS operations until it is reset by REJECT from network 20 through NAND gate 354—the normal reset occurs at the successful termination of the operation. For JOIN operations, BRDCAST is also generated to network 20 through latch 90 and once set at T1 it is held active by the feedback loop through OR gate 69 until it is reset by REJECT from network 20—normally at the successful termination of the operation. Latch 90 is prevented from being reset by the REJECT received by the broadcast attempt during a JOIN sequence through inverter 352 and NAND gate 354, which inhibits the reset at this time. The time T3 to T5 input to AND gate 66 (JOIN SEQ) through inverter 350 causes the JOIN SEQ signal to go inactive and the inverter 352 to go active after T3 so that any subsequent reset will be enabled to pass through NAND gate 354 and cause the GBS operation to terminate. Gates 72, 76, and 7eight provide the proper controls to input multiplexer 12 (FIG. 1) to cause it to select normal data when it is not in GBS mode, network routing data of all ONES from gates 221 to 228 during times T1 to T3 Local Barrier Select register 6 during time T4 (also provided through gates 221 to 228), Local Barrier Status register 8 during time T5, and zeroes when it is inactive.

The network 20 selects only one command to process at any given moment by performing a priority competition during T4. The purpose of gates 131 to 138 of FIG. 13 is to calculate the highest priority pending among all nodes at T4. This is done by comparing the bit pattern of the priority value sent to network 20 to the value received back from the network. This comparison is done in x-or gates 100 to 107. If the high order bit 0 does not compare as detected by x-or 100, NAND gate 121 output goes to 0 and forces all data lines driven to network 20 to zeroes; in other words, it removes itself from the competition. Likewise, if the next high order bit I does not compare as detected by x-or 101, NAND gate 122 (not shown) output goes to 0 and forces data lines 1 to 7 driven to the network to zeroes; in other words, it removes itself from the competition. Note that is not necessary to remove any high order data bit which compares favorably from driving the network because it is not causing any error in the calculation. Therefore, similar logic is used to remove the discomparing bit and all lower order bits from the calculation. Note that if all 7 high order bits compare and bit 7 does not, then gate 128 will only force DATA LINE 7 to a zero through gate 138.

The COMPARE EQUAL signal 110 determines if the priority selected by the network 20 is the same as the that sent from register 6. If the signal is a active, the node has won the priority competition and can proceed to transmit register 8 to the network 20 at T5. The COMPARE EQUAL signal is generated by gate 110 as the OR of a comparison of the priority value being sent to the network with the priority value being returned from the network. The compare is made by exclusive-or (x-or) gates 100 to 107. If any x-or inputs do not compare, the x-or gate will generate a logical 1, which forces OR gate 110 to a zero and indicates not equal.

Referring to FIG. 13, the WIN COMPETITION latch 252 is generated by clocking latch 252 from AND gate 250, which creates a pulse at PULSE VALID time at the end of time T4. Thus, latch 252 samples the state of the COMPARE EQUAL signal 110 and sets latch 252 if COMPARE EQUAL is a ONE. The WIN COMPETITION signal 252 causes the Local Barrier Status register 8 to be sent to network 20 during time T5 as enabled by Or gate 78 in FIG. 12, and causes the GBS PENDING latch 56 to be reset through NAND gate 32 at T5. The WIN COMPETITION signal 252 gets reset at the end of T5 by NAND gate 360.

Note that OR gate 78 causes Local Barrier Status Register 8 to be sent to network 20 every T5 time, not just during the WIN COMPETITION SIGNAL 252 being active periods. This means that the node 1 must take an active part in every GBS operation, whether it has won or not. The processor node 1 gets involved in the response to every GBS operation as shown in FIG. 13. AND gate 94 is a pulse used to load data from network 20 into GBS register 9 and then to inform the processor node 1 that new data has arrived. Interrupt Pulse 94 to node 1 is generated at the end of T4 and T5 at PULSE VALID 82 time. This loads two values into register 9, the winning priority at the end of time 4 and the GBS for the selected barrier set at the end of T5. It also issues two interrupts to the processor node 1. The processor node 1 responds to each interrupt by reading the contents of register 9. After time 4, processor node 1 reads the winning priority level and responds by loading register 8 with the present local status for the selected barrier or with zeroes if processor node 1 does not support the barrier set presently being updated. When node 1 loads register 8, it is detected by LBS READY latch 264 which sets immediately as an indication that the local barrier status is ready to transmit from register 8 to network 20. The LBS READY signal 264 then issues the ACCEPT signal to network 20 through AND gate 362 and OR gate 262 to indicate that the present node has finished its T5 response and placed barrier status on the data lines to network 20. The LBS READY signal 264 is reset at the end of T5.

The ACCEPT signal 270 to network 20 is generated through OR gate 262 at T3 or LBS READY and time T5 and at T4 through AND gate 278. NAND gate 274 detects the presence of any of the GATE OFF signals 121 to 128 as an indication that the T4 decision of NOT COMPARING has been made while OR gate 278 detects either that the decision of COMPARE EQUAL or NOT has been made. The output of gate 278 is ANDed in gate 276 with both T4 and T4 DELAYED so as to not allow any erroneous spikes to pass through gate 276 while gates 110 and 274 are settling out.

Referring to FIG. 13, latch 268 is used to differentiate an INITIATING NODE from a joining node (NON-INITIATING NODE). This decision is based on OR gate 280 which detects whether an ACCEPT pulse has been issued from network 20 a T2 as detected by latches 256 and 258 and gate 82. When this occurs, the INITIATING NODE latch 268 is set and held set by the feedback loop through OR gate 280 until the operation is terminated by REJECT RESET 46. The INITIATING NODE 268 signal is used in NAND gate 98 FIG. 12) to cause the VALID signal generated by the initiating node to pulse through AND gate 34 every time PULSE VALID 82 is generated.

Referring to FIG. 12, decoder 64 monitors the data lines coming from network 20 to detect an all ONES data pattern. AND gate 66 detects that a JOIN SEquence has been commanded by the initiating node if the output from decoder 64 is active along with the VALID and BRDCAST lines from network 20, local time T3 to T5 signals are not set, and the NON-INITIATING NODE signal is set. Gate 66, when active, starts a JOIN SEQ as a joining node function through OR gate 54, which in turn starts the operation control counter 52 sequencing from T1.

Figure 14:
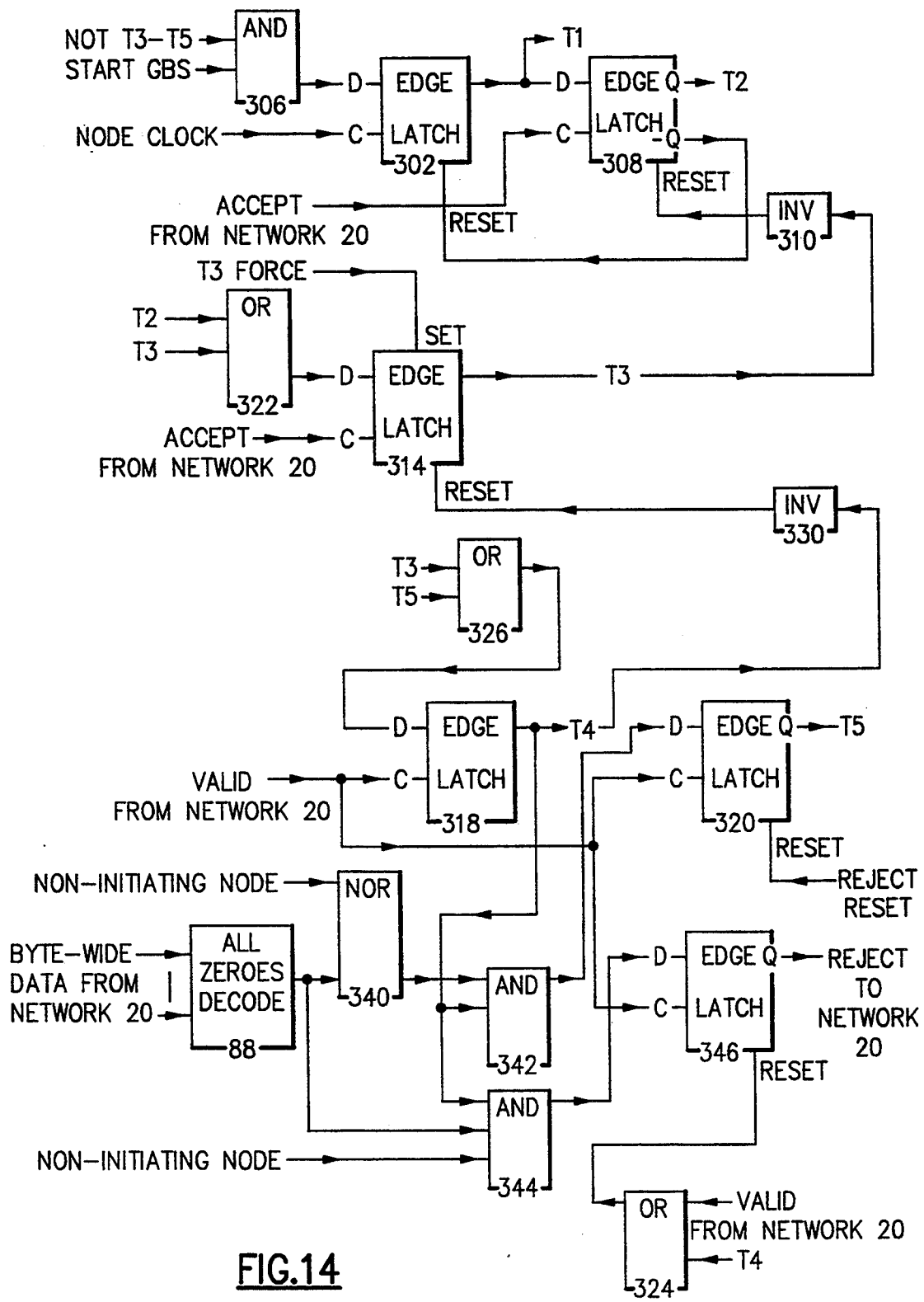
FIG. 14 illustrates the remainder of detailed logic implementation of the preferred embodiment of the SYNC-NET function located at each processing node and in particular shows the control counter and branching functions required.

Referring to FIG. 14, further details of operation counter 52 are shown. The START GBS signal 54 to AND gate 306 causes T1 latch 302 to set. Latch 302's being set causes T2 latch 308 to set on the subsequent rise of ACCEPT from network 20. Latch 308 setting causes T1 latch 302 to reset, and the NOT T3-T5 signal from inverter 350 ( FIG. 12) through AND gate 306 prevents latch 302 from setting again as long as any T3 to T5 signal is active.

T2 latch's 308 being set causes T3 latch 314 to set through OR gate 322 at the next rise of the ACCEPT signal from network 20. Latch 314's setting causes T2 latch 308 to reset through inverter 310. T3 latch 314 can also be forced to set directly by AND gate 85 ( FIG. 12) that causes a force of T3 when a REJECT is detected by a joining node attempting to broadcast during T1 and T2. T3 latch 314 also is the last T latch clocked with the rise of the ACCEPT signal from the network, therefore the T3 state must be held until T4 actually gets set at a later time. Thus, Or gate 322 is used to provide a feedback loop to latch 314 that will not allow it to be reset by the rise of the ACCEPT pulse from the network. Instead T3 latch 314 is reset by the setting of T4 through inverter 330.

T3 latch's 314 being set causes T4 latch 318 to set through OR gate 326 at the next rise of the VALID signal from network 20. OR gate 326 is also used to return to T4 from T5 when VALID rises from network 20. T4 latch 318 is reset by the rise of the VALID signal from network 20 when neither T3 nor T5 is active through OR gate 326.

T4 latch 318 is gated by AND gates 342 and 344, which are mutually exclusive, and will cause either T5 latch 320 or REJECT latch 346 to network 20 to set on the subsequent rise of the VALID signal from network 20. The decision as to which option occurs is based on the state of the eight data lines from network 20 as detected by decoder 88. If all zeroes are detected on the data lines (meaning zero priority-terminate), the output of decoder 88 goes active through gate 344 and during NON-INITIATING NODE sequences at T4 causes latch 346 to set on the rise of VALID from network 20. Latch 346 leads to the termination of the GBS operation and stays set until both the VALID signal from the network and T4 go to zeroes as detected by OR gate 324. If all zeroes are NOT detected on the data lines from network 20 (meaning continue the GBS operation), the output of decoder 88 goes inactive causing NOR gate 340 to go active to AND gate 342 and during T4 causes T5 latch 320 to set on the rise of VALID from network 20. T5 latch 320 is reset by the next rise of VALID from the network which cause T4 latch 318 to set again or by REJECT RESET 46 to terminate the GBS operation.

OTHER PREFERRED EMBODIMENTS

Other embodiments which we may prefer to use in certain instances are within the scope of our inventions and will be described by way of example of changes to the preferred embodiment which has been described with reference to the drawings.

For example, SYNC-NET implementation is not restricted to the processing of multiple priority levels. If only one priority level is ever broadcast in a system over the multi-stage network 20, the priority competition of T4 can be eliminated and the operation automatically terminated after the first T5 time so that the operation control counter 52 of FIG. 12 would only ever implement one fixed sequence—that being T1 to T2 to T3 to T5 and then terminate.

For example, SYNC-NET implementation is not restricted to processing only barrier synchronization commands. It is possible to mix various types of multi-sender and broadcast commands over SYNC-NET and have consistent operation. Special bit patterns in Register 6 would be assigned to specify other types of multi-sender and broadcast commands rather than being limited exclusively to GBS commands. The command competition during T4 would still select the highest priority command pending at any moment, it just might not be a GBS command. The SYNC-NET feature of linking back-to-back commands would still function properly to keep multi-sender and broadcast mode active until all pending commands were serviced. Each barrier and each other multi-sender operation would be assigned a unique 8 bit command that would define its arbitration priority level over network 20.

For example, SYNC-NET implementation is not restricted to two-stage networks. The network selection times, like T1 and T2, may either be increased or decreased depending on the number of stages in the network.

For example, SYNC-NET implementation is not restricted to 8-bit widths. The LBS and GBS Registers 8 and 9 and the number of data lines in network 20 can be varied to permit more or less than eight barriers per set.

For example, SYNC-NET implementation is not restricted to 255 barrier sets. The Barrier Select Register 8 size can be varied in size to permit more or less than 255 barrier sets.

For example, SYNC-NET implementation is not restricted to collecting only GBS status. An option exists where the hardware could load GVS Register 9 from the outputs of x-or gates 100 to 107 rather than from the network. This would tell the local processor nodes which barriers agree with its present local LBS status as defined by a logical 0 in the corresponding bit position or which didn't agree as defined by a logical 1 in the corresponding bit position.

Clearly, the inventions which we have described by way of example and in illustration of our best mode of practicing the inventions, in the various embodiments described, provide a basis for much potential growth. Accordingly, it will be understood that those skilled in the ad, both now and in the future, will envision further improvements even by way of invention, and these should be understood to be within the claimed scope which should be construed to protect and preserve the rights of the inventors.

V. DEFINITION OF TERMS

ARBITRATION—The act of selecting one winner at a time from a set of multiple contenders.

ARBITRATION SWITCH—A switching apparatus capable of resolving contention among several or multiple contenders.

BARRIER SET—A set of 8 entirely independent and separate barriers capable of being addressed and updated over the network in the same individual network operation.

BARRIER SYNCHRONIZATION—A method of synchronizing multiple system elements which are all advancing asynchronously in relation to each other by checking pointing at predefined barrier. No element is permitted to pass a barrier until all other elements involved in the barrier have reached the barrier.

BROADCAST—A specific connection pattern internal to an interconnection network that allows one transmitting element to send and be connected to all receiving elements attached to the network.

BROADCAST COMMANDS OR MESSAGES—Commands or messages that are send via an interconnection network from one transmitting element to all receiving elements.

BROADCAST/SWITCHING APPARATUS—A switching apparatus that has the inherent means required to establish BROADCAST connections.

BROADSEND—A multi-sender operation with all nodes participating in a joint operation simultaneously and all nodes sending data to the multi-stage network simultaneously.

DEAD FIELD—The transmission of zeroes on all eight data lines to the interconnection network for a specific length of time (usually one clock time) by the transmitting element.

IDLE—The state of a transmitting node, receiving node, or network connection (INPUT PORT or OUTPUT PORT) that has no present transmission or operation in progress.

JOIN—The act of a second or multiple transmitting element establishing a set of programmable connections within a switching apparatus devices comprising a network for the purpose of logically ORing its data into any broadcast or multi-cast operation in progress as started by a first transmitting element.

JOIN COMMAND—The signal sequence transmitted by a transmitting node that enables the node to JOIN the broadcast or multi-cast operation in progress.

JOINING NODE—One of the subsequent transmitting nodes to JOIN a broadcast or multi-cast operation in progress.

INPUT PORT—The connection channel or set of 12 communication signal lines required to connect a transmitting element to an interconnection network or to connect the previous stage of a cascaded switching apparatus to the present stage.

MULTI-CAST—A specific connection pattern internal to an interconnection network that allows one transmitting element to send and be connected to a subset of receiving elements attached to the network.

MULTI-CAST COMMANDS OR MESSAGES—Commands or messages that are send via an interconnection network from one transmitting element to a subset of receiving elements.

MULTI-SENDER—A connection or operation supported over an interconnection network that permits data from several or multiple transmitting elements to be logically ORed in the network and simultaneously sent to one, several, or multiple receiving elements.

MULTI-SENDER/SWITCHING APPARATUS—A switching apparatus which has the inherent means required to perform multi-sender operations and to establish multi-sender connections involving logical ORing of the data sent by multiple transmitting nodes.

NETWORK—A multiplicity of switching apparatus devices interconnected in a fixed pattern for the purpose of interconnecting multiple system elements and permitting the elements to exchange communication commands and messages.

NETWORK ARBITRATION—A single joint operation performed over the network and involving all attached nodes. The network and all nodes perform jointly to calculate the network requestor having the high priority operation pending at any given time and to give the usage of the network to that requestor as the arbitration winner of the network facilities.

NETWORK REQUESTOR—Any node wishing to use the network for sending or processing a pending operation over the network.

NODE—A device or system element attached to an interconnection network. Used interchangeably with system element.

OUTPUT PORT—The connection channel or set of 12 communication signal lines required to connect an interconnection network to a receiving element or to connect the next stage of a cascaded switching apparatus to the present stage.

PAUSE—A lapse in the transmission of data through an interconnection network that will resume after a variable delay.

PATH SELECTION—The act of programming the switching apparatus to select a specific path or route through the interconnection network for the purpose of interconnecting two or more system elements via the network.

PENDING OPERATION—An operation that has been started at a system element and is waiting for the usage of the network facilities to complete the operation.

POINT to POINT—a connection having one and only one transmitter and one and only one receiver.

PROCESSOR NODE—A node or system element having computational power.

PROCESSING NODE—A node or system element having computational power.

RECEIVING ELEMENT—A system element attached as a node to an or NODE interconnection network that has the capability of receiving commands or messages from the network.

RE-SYNC—The act of re-synchronizing a receiving element to prevent drift and loss of synchronization with a transmitting element.

STANDARD OPERATION—An connection through the network for the purpose of connecting one and only one transmitting element to one and only one receiving element.

SWITCHING APPARATUS—The circuit element comprising an interconnection network that provides programmable connection links allowing the network to instantaneously make and break a variety of interconnection patterns without having to physically change any interconnection wires.

TRANSMITTING ELEMENT—A system element attached as a node to an or NODE interconnection network that has the capability of sending commands or messages to the network. A element which is capable both transmitting and receiving will be referred to as a transmitting element when in the act of sending to the network, and referred to as a receiving element when it is in act of receiving from the network.

Clearly, the inventions which we have described by way of example and in illustration of our best mode of practicing the inventions, in the various embodiments described, provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. A multi-stage interconnection network and barrier synchronization apparatus jointly functioning in a system comprising:
a plurality of transmitting elements for transmitting data to the interconnection network and to the barrier synchronization apparatus;
a plurality of receiving elements for receiving data from the interconnection network and from the barrier synchronization apparatus;
a multi-sender switch apparatus means comprising the network for coupling said elements asynchronously through input to output port connections for establishing point to point input to output port connections, single input to multiple or all output port connections, and multiple or all input port connections to multiple or all output port connections;
a barrier synchronization apparatus located at every system element, the barrier synchronization apparatus including:
a barrier select register for identifying barriers required to be updated;
a local barrier status register for storing global barrier status data;
a global barrier status register for storing global barrier status data and having an input coupled from the network and an output means coupled to the barrier select register and the local barrier status register;
a barrier synchronization control means for controlling a barrier synchronization operation over the network and for providing global barrier status data to the system elements and having an input means coupled from the node and the network and an output means coupled to the network; and
a data selection multiplexer, controlled by the barrier synchronization control means for selecting data sources from the barrier select register and the local barrier status register for transmission of data to the network.

2. The system of claim 1 wherein the barrier synchronization apparatus comprises a means for calculating a status of multiple barriers simultaneously, said means including the local barrier status register, the global barrier status register, and the barrier select register.

3. The system of claim 1 wherein the barrier synchronization apparatus comprises a means for mixing priority calculation cycles and barrier synchronization calculation cycles on an alternating, back to back basis until all requestors of barrier updates are satisfied.

4. The system of claim 1 wherein the barrier synchronization apparatus comprises a means for barrier synchronization hardware to work jointly with a node processor to respond individually to every joint calculation over the network, for the barrier synchronization hardware to interrupt a processing node and request information pertinent to the joint calculation, and for the node processor to provide the information to barrier synchronization logic which in turn supplies the information to the network for performing the joint calculation.

5. The system of claim 3, wherein the barrier synchronization apparatus and said network continue to perform said back-to-back priority calculation and barrier synchronization calculation cycles until a priority of all zeroes is detected over the network which is interpreted as an operation termination command.

6. The system of claim 1 wherein the barrier synchronization apparatus comprises a means for an initiating requestor to control sequencing of joint calculations until all said calculations are exhausted.

7. The system of claim 1 wherein the network provides a means for all the system elements to transmit a data bit pattern simultaneously and to use said network to logically OR the data bit patterns and to provide a result back to all said elements simultaneously.

8. A barrier synchronization apparatus comprising:
a plurality of nodes;
a network for establishing simultaneous unbuffered asynchronous communication between the nodes;
initiation means included in at least one of the nodes for transmitting a barrier status initiation signal through the network to others of said nodes;
synchronization means included in said others of the nodes for synchronizing at least one barrier between said nodes, each synchronization means including
means for receiving the barrier status initiation signal over the network,
means for transmitting and receiving barrier status signals over the network and coupled to the means for receiving the barrier status initiation signal,
means for storing local and global status data of said at least one barrier and coupled to said means for transmitting and receiving barrier status signals, and
means for updating the global status data of said at least one barrier in response to a global barrier status signal received over the network.

9. The apparatus according to claim 8, wherein the network includes means for producing the global barrier status signal in response to barrier status signals transmitted simultaneously by the nodes.

10. The apparatus according to claim 8, wherein the network includes means for distributing the global barrier status signal to said plurality of nodes.

11. The apparatus according to claim 8, wherein the network includes a multi-stage, unclocked, unbuffered, asynchronous network.

12. The apparatus according to claim 8, wherein each of the nodes includes said initiation means and said synchronization means.

13. The apparatus according to claim 8, wherein the synchronization means further includes means for storing local barrier status data.

14. The apparatus according to claim 13, wherein the means for storing the local barrier status data and the means for storing the global barrier status data comprise registers.

15. The apparatus according to claim 8, further comprising arbitration means for determining a highest priority requestor from among the nodes, and wherein the highest priority requestor is granted immediate usage of the apparatus for barrier synchronization.

16. The apparatus of claim 15, further comprising:

means for withdrawing nodes from the barrier synchronization which are not determined to be the highest priority requestor;

means for keeping pending barrier initiation signals from withdrawn nodes;

means for maintaining network connections of the withdrawn nodes; and means for continuing the withdrawn nodes' participation in subsequent determinations of highest priority until they are determined to be the highest priority requestor.

17. The apparatus according to claim 15, wherein the arbitration means includes means for determining that more than one of the nodes is a highest priority requestor, and wherein the highest priority requestor nodes jointly participate in the barrier synchronization.

18. The apparatus according to claim 15, further comprising means for joining at least one node not determined by the arbitration means to be the highest priority requestor into the barrier synchronization.

19. The apparatus of claim 8, wherein the means for storing stores the global status data of two or more barriers, and wherein the means for updating updates the status of said two or more barriers in response to the global barrier status signal.

20. The apparatus according to claim 8, wherein a subset of the plurality of nodes participates in a barrier synchronization.

21. The apparatus of claim 17 wherein the highest priority requestor nodes are all simultaneously satisfied by a single and immediate usage of the network and all said highest priority requestor nodes withdraw a present request to use the network for barrier synchronization.

22. The apparatus of claim 15 wherein the network includes a means for providing the network for usage by a next highest priority requestor without the next highest priority requestor's having to re-establish network connections for its individual usage.

23. The apparatus of claim 8 wherein the network provides a means for all said nodes to receive a positive indication via a composite ACCEPT signal that the barrier synchronization has been completed by all participating nodes.

* * * * *